(12) United States Patent
Chiera et al.

(10) Patent No.: US 11,415,041 B2
(45) Date of Patent: Aug. 16, 2022

(54) FLAME TRIGGERED AND CONTROLLED VOLUMETRIC IGNITION

(71) Applicant: Woodward, Inc., Fort Collins, CO (US)

(72) Inventors: Domenico Chiera, Fort Collins, CO (US); Charles Brennecke, Cheyenne, WY (US); Samuel James McCreery, Loveland, CO (US); Jeffrey Carlson, Denver, CO (US); Suraj Nair, Fort Collins, CO (US); Gregory James Hampson, Boulder, CO (US)

(73) Assignee: Woodward, Inc., Fort Collins, CO (US)

( * ) Notice: Subject to any disclaimer, the term of this patent is extended or adjusted under 35 U.S.C. 154(b) by 33 days.

(21) Appl. No.: 16/572,474

(22) Filed: Sep. 16, 2019

(65) Prior Publication Data

US 2021/0079835 A1   Mar. 18, 2021

(51) Int. Cl.
   *F02B 19/12* (2006.01)
   *F02B 19/18* (2006.01)
   (Continued)

(52) U.S. Cl.
   CPC .............. *F02B 19/12* (2013.01); *F02B 19/18* (2013.01); *F02F 3/26* (2013.01); *F02P 5/103* (2013.01)

(58) Field of Classification Search
   CPC ...... F02B 19/12; F02B 19/18; F02B 19/1023; F02B 19/1061; F02B 19/14; F02P 5/103; F02F 3/26
   See application file for complete search history.

(56) References Cited

U.S. PATENT DOCUMENTS

| 1,511,739 A | * | 10/1924 | McDowell | .............. | H01T 13/54 |
| | | | | | 138/40 |
| 1,611,856 A | | 12/1926 | Farnsworth | | |

(Continued)

FOREIGN PATENT DOCUMENTS

| CN | 1878934 | 12/2006 |
| CN | 201187370 | 1/2009 |

(Continued)

OTHER PUBLICATIONS

Office Action issued in Chinese Application No. 2016800277187 dated Aug. 20, 2018.
(Continued)

*Primary Examiner* — Sizo B Vilakazi
*Assistant Examiner* — Brian R Kirby
(74) *Attorney, Agent, or Firm* — Fish & Richardson P.C.

(57) ABSTRACT

The subject matter of this specification can be embodied in, among other things, a method of igniting an air/fuel mixture in an internal combustion engine includes receiving an air/fuel mixture into a pre-combustion chamber, the pre-combustion chamber enclosing a portion of an igniter, igniting the air/fuel mixture in in the pre-combustion chamber with the igniter to produce a flame, directing the flame to eject the pre-combustion chamber through a collection of passages in a wall of the pre-combustion chamber, toward a peripheral wall of a main combustion chamber of the internal combustion engine, igniting, by the flame, air/fuel mixture in the main combustion chamber adjacent the peripheral wall, and then igniting air/fuel mixture in the main combustion chamber in a central region of the main combustion chamber with a propagating flame front of the ignited air/fuel mixture or a portion of the directed flame adjacent the peripheral wall.

37 Claims, 13 Drawing Sheets

(51) Int. Cl.
  *F02F 3/26*      (2006.01)
  *F02P 5/10*      (2006.01)

(56) References Cited

U.S. PATENT DOCUMENTS

| | | | |
|---|---|---|---|
| 1,648,647 A * | 11/1927 | Krettingen | F02B 23/04 123/275 |
| 1,694,269 A * | 12/1928 | Lang | F02B 23/063 123/251 |
| 2,673,554 A | 3/1954 | Thaheld | |
| 2,677,356 A * | 5/1954 | Pielstick | F02B 19/14 123/266 |
| 2,741,229 A * | 4/1956 | Stump | F02B 23/04 123/270 |
| 2,758,576 A | 8/1956 | Schlamann | |
| 3,195,519 A * | 7/1965 | Bishop | F02B 23/104 123/275 |
| 3,244,159 A * | 4/1966 | Meurer | F02B 23/0657 123/263 |
| 3,270,722 A | 9/1966 | Springer | |
| 3,703,886 A * | 11/1972 | Witzky | F02B 17/005 123/262 |
| 4,004,413 A | 1/1977 | Ueno et al. | |
| 4,091,772 A | 5/1978 | Heater et al. | |
| 4,096,832 A | 6/1978 | Casull | |
| 4,143,627 A | 3/1979 | Noguchi | |
| 4,170,968 A | 10/1979 | Noguchi | |
| 4,224,902 A * | 9/1980 | Binder | F02B 19/14 123/286 |
| 4,232,638 A | 11/1980 | Takahashi et al. | |
| 4,242,990 A | 1/1981 | Scherenberg | |
| 4,278,057 A * | 7/1981 | Urlaub | F02B 23/104 123/260 |
| 4,398,513 A | 8/1983 | Tanasawa et al. | |
| 4,441,469 A | 4/1984 | Wilke | |
| 4,473,046 A * | 9/1984 | Aoyama | F02B 23/0675 123/285 |
| 4,499,871 A * | 2/1985 | Neitz | F02M 61/20 123/301 |
| 4,612,888 A | 9/1986 | Ishida | |
| 4,765,293 A | 8/1988 | Gonzalez | |
| 4,787,349 A * | 11/1988 | Hilger | F23Q 7/001 123/297 |
| 4,838,222 A * | 6/1989 | Yanagisawa | F02B 23/0675 123/301 |
| 5,024,193 A * | 6/1991 | Graze, Jr. | F02B 19/1023 123/259 |
| 5,076,229 A | 12/1991 | Stanley | |
| 5,085,189 A | 2/1992 | Huang | |
| 5,271,365 A | 12/1993 | Oppenheim et al. | |
| 5,555,868 A | 9/1996 | Neumann | |
| 5,560,326 A | 10/1996 | Merritt | |
| 5,678,517 A | 10/1997 | Chen et al. | |
| 5,715,788 A | 2/1998 | Tarr et al. | |
| 5,803,026 A | 9/1998 | Merritt et al. | |
| 5,829,407 A | 11/1998 | Watson et al. | |
| 6,095,111 A | 8/2000 | Ueda et al. | |
| 6,213,086 B1 * | 4/2001 | Chmela | F02B 1/12 123/179.5 |
| 6,279,550 B1 | 8/2001 | Bryant | |
| 6,463,890 B1 | 10/2002 | Chomiak | |
| 6,574,961 B2 | 6/2003 | Shiraishi et al. | |
| 6,595,182 B2 | 7/2003 | Oprea et al. | |
| 7,066,137 B1 * | 6/2006 | Dawson | F02B 19/12 123/266 |
| 7,086,376 B2 | 8/2006 | McKay | |
| 7,353,797 B1 * | 4/2008 | Breidenthal | F02B 23/0675 123/263 |
| 7,370,626 B2 | 5/2008 | Schubert | |
| 7,438,043 B2 | 10/2008 | Shiraishi et al. | |
| 7,659,655 B2 * | 2/2010 | Tozzi | F02B 19/12 123/285 |
| 7,669,583 B2 * | 3/2010 | Moriya | F02D 35/023 123/406.41 |
| 7,743,753 B2 | 6/2010 | Fiveland | |
| 7,848,871 B2 | 12/2010 | Onishi et al. | |
| 7,856,956 B2 * | 12/2010 | Inoue | F02B 19/12 313/123 |
| 8,074,620 B2 * | 12/2011 | Filipek | F02P 15/06 123/285 |
| 8,387,587 B2 | 3/2013 | Ogata et al. | |
| 8,733,331 B2 | 5/2014 | McAlister | |
| 8,757,129 B1 | 6/2014 | Hill et al. | |
| 8,800,536 B2 | 8/2014 | Plata | |
| 8,857,405 B2 * | 10/2014 | Attard | F02B 19/14 123/266 |
| 8,924,136 B2 | 12/2014 | Nakamoto et al. | |
| 8,925,518 B1 * | 1/2015 | Riley | F02D 41/0027 123/304 |
| 9,151,212 B2 | 10/2015 | Dumser et al. | |
| 9,279,379 B2 * | 3/2016 | Frampton | F02D 35/026 |
| 9,476,347 B2 | 10/2016 | Chiera et al. | |
| 9,500,118 B2 | 11/2016 | Tozzi et al. | |
| 9,562,510 B2 * | 2/2017 | Niessner | G01M 15/08 |
| 9,850,805 B2 | 12/2017 | Sotiropoulou et al. | |
| 9,890,689 B2 * | 2/2018 | Hampson | F02D 41/3005 |
| 9,903,264 B1 * | 2/2018 | Yeager | F02D 35/023 |
| 9,903,287 B2 * | 2/2018 | Kitagawa | F02P 5/153 |
| 2001/0050069 A1 | 12/2001 | Oprea et al. | |
| 2003/0196634 A1 | 10/2003 | Lausch | |
| 2004/0061421 A1 | 4/2004 | Morita et al. | |
| 2004/0100179 A1 | 5/2004 | Boley et al. | |
| 2004/0123849 A1 | 7/2004 | Bryant | |
| 2004/0177837 A1 | 9/2004 | Bryant | |
| 2004/0261760 A1 * | 12/2004 | Robinet | F02B 19/12 123/266 |
| 2005/0000484 A1 | 1/2005 | Schultz et al. | |
| 2005/0051130 A1 | 3/2005 | Lampard | |
| 2005/0092285 A1 | 5/2005 | Klonis et al. | |
| 2005/0172929 A1 | 8/2005 | Strauss | |
| 2005/0211217 A1 | 9/2005 | Boley et al. | |
| 2005/0224606 A1 | 10/2005 | Dingle | |
| 2005/0279321 A1 | 12/2005 | Crawford et al. | |
| 2006/0196471 A1 * | 9/2006 | Moriya | F02P 5/153 123/406.41 |
| 2006/0278195 A1 | 12/2006 | Hotta et al. | |
| 2007/0089703 A1 * | 4/2007 | Shiraishi | F02B 19/16 123/266 |
| 2007/0151540 A1 | 7/2007 | Takahashi et al. | |
| 2007/0169737 A1 | 7/2007 | Gong et al. | |
| 2007/0261672 A1 | 11/2007 | Lippert et al. | |
| 2008/0017165 A1 | 1/2008 | Schubert | |
| 2008/0168963 A1 | 7/2008 | Gagliano et al. | |
| 2008/0257301 A1 | 10/2008 | Hotta et al. | |
| 2009/0241896 A1 | 10/2009 | Fiveland et al. | |
| 2009/0309475 A1 * | 12/2009 | Tozzi | H01T 13/54 313/143 |
| 2010/0192909 A1 | 8/2010 | Ikeda | |
| 2011/0036638 A1 | 2/2011 | Sokol et al. | |
| 2011/0062850 A1 | 3/2011 | Tozzi | |
| 2011/0065350 A1 | 3/2011 | Burke | |
| 2011/0297121 A1 | 12/2011 | Kraus et al. | |
| 2011/0308489 A1 | 12/2011 | Herden | |
| 2011/0320108 A1 | 12/2011 | Morinaga et al. | |
| 2012/0013133 A1 | 1/2012 | Rios, III et al. | |
| 2012/0064465 A1 | 3/2012 | Borissov et al. | |
| 2012/0103302 A1 | 5/2012 | Attard | |
| 2012/0118262 A1 | 5/2012 | Johnson | |
| 2012/0118275 A1 * | 5/2012 | Kang | F02D 37/02 123/568.11 |
| 2012/0125279 A1 | 5/2012 | Hampson et al. | |
| 2012/0125287 A1 | 5/2012 | Chiera et al. | |
| 2012/0125636 A1 | 5/2012 | Linde et al. | |
| 2012/0303238 A1 * | 11/2012 | Verner | F02D 41/2474 73/114.16 |
| 2013/0199483 A1 * | 8/2013 | Herden | F02B 19/12 123/143 B |
| 2014/0032081 A1 | 1/2014 | Willi et al. | |
| 2014/0144406 A1 * | 5/2014 | Schock | F02B 19/12 123/260 |
| 2015/0040845 A1 | 2/2015 | Chiera et al. | |

(56) References Cited

U.S. PATENT DOCUMENTS

| | | | | |
|---|---|---|---|---|
| 2015/0068487 | A1* | 3/2015 | Bowing | F02B 23/0672 123/193.6 |
| 2015/0167576 | A1 | 6/2015 | Glugla et al. | |
| 2015/0260131 | A1 | 9/2015 | Riley et al. | |
| 2016/0047323 | A1 | 2/2016 | Suzuki | |
| 2016/0230645 | A1* | 8/2016 | Schock | F02B 19/1052 |
| 2016/0245151 | A1* | 8/2016 | Yuuki | F02B 19/08 |
| 2017/0096932 | A1* | 4/2017 | Chiera | F02M 21/0275 |
| 2018/0334950 | A1* | 11/2018 | Yoshizumi | F02B 19/16 |
| 2019/0048784 | A1* | 2/2019 | Ashizawa | F02B 19/1023 |
| 2020/0165961 | A1* | 5/2020 | Hamada | F02B 19/12 |
| 2020/0200068 | A1* | 6/2020 | Schock | F02B 19/18 |

FOREIGN PATENT DOCUMENTS

| | | | |
|---|---|---|---|
| CN | 203218710 | | 9/2013 |
| CN | 203434440 | | 2/2014 |
| CN | 104421049 | | 3/2015 |
| EP | 1043485 | | 10/2000 |
| EP | 1454040 | | 9/2004 |
| JP | S5287517 | | 7/1977 |
| JP | S5415105 | | 2/1979 |
| JP | S55142931 | | 11/1980 |
| JP | H02132815 | | 11/1990 |
| JP | H07208170 | | 8/1995 |
| JP | 2001263069 | * | 9/2001 |
| JP | 2001263069 A | * | 9/2001 |
| JP | 2005264815 | | 9/2005 |
| JP | 2006329092 | | 12/2006 |
| JP | 2011214492 | | 10/2011 |
| JP | 2011214492 A | * | 10/2011 ............. F02B 19/12 |
| JP | 2013119803 A | * | 6/2013 |
| JP | 2015094339 A | * | 5/2015 |
| KR | 20140117152 | | 10/2014 |
| WO | WO 2015138987 | | 9/2015 |
| WO | WO 2016025746 | | 2/2016 |

OTHER PUBLICATIONS

Office Action issued in Japanese Application No. 2017-508091 dated Mar. 20, 2018; 4 pages.
PCT International Preliminary Report on Patentability, PCT/US2015/045113, dated Feb. 23, 2017, 7 pages.
PCT International Search Report and Written Opinion of the International Searching Authority, PCT/US2015/045113, dated Nov. 27, 2015, 11 pages.
PCT International Search Report and Written Opinion of the International Searching Authority, PCT/US2016/022559, dated Jun. 24, 2016, 14 pages.
PCT International Search Report and Written Opinion of the International Searching Authority, PCT/US2016/023272, dated Jun. 16, 2016, 11 pages.
PCT International Search Report and Written Opinion in International Appln. No. PCT/US2020/050990, dated Nov. 5, 2020, 13 pages.
Alger et al., "The Effect of Hydrogen Enrichment on EGR Tolerance in Spark Ignited Engines", SAE Technical Paper, 2007-01-0475, Apr. 2007, 12 pages.
Barta et al., "Real time combustion diagnostics and control for improved engine management", MTZ Industrial, 2015, 6(1):26-31.
Curran et al., "Efficiency and Emissions Mapping of RCCI in a Light-Duty Diesel Engine", SAE Technical Paper Series, 2013-01-0289, Apr. 2013, 10 pages.
Curran et al., "In-Cylinder Fuel Blending of Gasoline/Diesel for Improved Efficiency and Lowest Possible Emissions on a Multi-Cylinder Light-Duty Diesel Engine", SAE Technical Paper, 2010-01-2206, 2010, 20 pages.
Dahodwala et al., "Investigation of Diesel and CNG Combustion in a Dual Fuel Regime and as an Enabler to Achieve RCCI Combustion", SAE Technical Paper, 2014-01-1308, Apr. 2014, 14 pages.
Einewall et al., "Lean Burn Natural Gas Operation vs. Stoichiometric Operation with EGR and a Three Way Catalyst", SAE Technical Paper, 2005-01-0250, Apr. 2005, 22 pages.
Han et al., "Mechanism of Soot and NOx Emission Reduction Using Multiple-Injection in a Diesel Engine", SAE Technical Paper, 960633, 1996, 19 pages.
Hanson et al., "Use of Adaptive Injection Strategies to Increase the Full Load Limit of RCCI Operation", Journal of Engineering for Gas Turbines and Power, 2016, 138(10):102802-102812.
Heywood., Internal Combustion Engine Fundamentals, McGraw Hill, 1988, Chapter 9(6).
Hockett et al., "Development and Validation of a Reduced Chemical Kinetic Mechanism for CFD Simulations of Natural Gas/Diesel Dual Fuel Engines", Energy and Fuels, Jan. 2016, 30(3):2414-2427.
Hockett et al., "Natural gas/diesel RCCI CFD simulations using multi-component fuel surrogates", International Journal of Powertrains, 6(1):76-108.
Hockett, "A Computational and Experimental Study on Combustion Processes in Natural Gas/Diesel Dual Fuel Engines", Ph.D., Thesis, 2015, 249 pages.
Martin et al., "Intermediate Combustion Modes between Conventional Diesel and RCCI", SAE Technical Paper Series, 2018-01-0249, 2018, 26 pages.
Neame et al., "Improving the Fuel Economy of Stoichiometrically Fuelled by S.I. Engines by Means of EGR and Enhanced Ignition—A Comparison of Gasoline, Methanol and Natural Gas", SAE 1984 Transactions, 1995, 104(4):1062-1076.
Nieman et al., "Heavy-Duty RCCI Operation Using Natural Gas and Diesel", SAE International Journal of Engines, May 2012, 5(2):270-285.
Okamoto et al., "New Concept for Overcoming the Trade-Off Between Thermal Efficiency, Each Loss and Exhaust Emissions in a Heavy Duty Diesel Engine", SAE International Journal of Engines, Jun. 2016, 9(2):859-867.
Patterson et al., "Heat Release Design Method for HCCI in Diesel Engines with Simulation", SAE International, 2008, pp. 1-15.
Radu et al., "On the Knock Characteristics of LPG in a Spark Ignition Engine", SAE Technical Paper Series, 2005-01-3773, Oct. 2005, 11 pages.
Roth et al., "Condensing LPL EGR Mixer with Mid-Pressure Loop", SAE International Journal of Engines, Sep. 2015, 8(4):4544-1552.
Shahlari et al., "A Comparison of Engine Knock Metrics", SAE Technical Paper Series, 2012-32-0007, Oct. 2012, 12 pages.
Simio et al., "A Study of Different EGR Routes on a Heavy Duty Stoichiometric Natural Gas Engine", SAE Technical Paper Series, 2009-24-0096, 2009, 8 pages.
Splitter et al., "Injection Effects in Low Load RCCI Dual-Fuel Combustion", SAE Technical Paper, 2011-24-0047, 2011, 23 pages.
Turns., "An Introduction to Combustion", McGraw Hill, Boston, 2000, Chapter 15, 24 pages.
U.S. EPA., "Integrated Science Assessment (ISA) for Oxides of Nitrogen and Sulfur—Ecological Criteria (Final Report, 2008)", U.S. Environmental Protection Agency, Washington DC, EPA/600/R-08/082F.
U.S. EPA., "Integrated Science Assessment (ISA) for Oxides of Nitrogen—Health Criteria (Final Report, 2016)", U.S. Environmental Protection Agency, Washington DC, EPA/600/R-15/068.
Williams et al., "EGR and Backpressure Effects on Knock Behavior in Stoichiometric Natural Gas Engines" Proceedings of the ASME 2017 Internal Combustion Engine Division Fall Technical Conference, Oct. 2017, 9 pages.
Written Opinion of the International Preliminary Examining Authority issued in International Application No. PCT/US2016/022559 dated Mar. 7, 2017; 5 pages.
Zhong et al., "EGR Systems Evaluation in Turbocharged Engines", SAE Technical Paper, 2013-01-0936, Nov. 2013, 14 pages.
PCT International Search Report and Written Opinion in International Appln. No. PCT/IB2020/060794, dated Feb. 1, 2021, 29 pages.

(56) References Cited

OTHER PUBLICATIONS

International Preliminary Report on Patentability in International Application No. PCT/US2020/05990, dated Mar. 15, 2022, 7 pages.

* cited by examiner

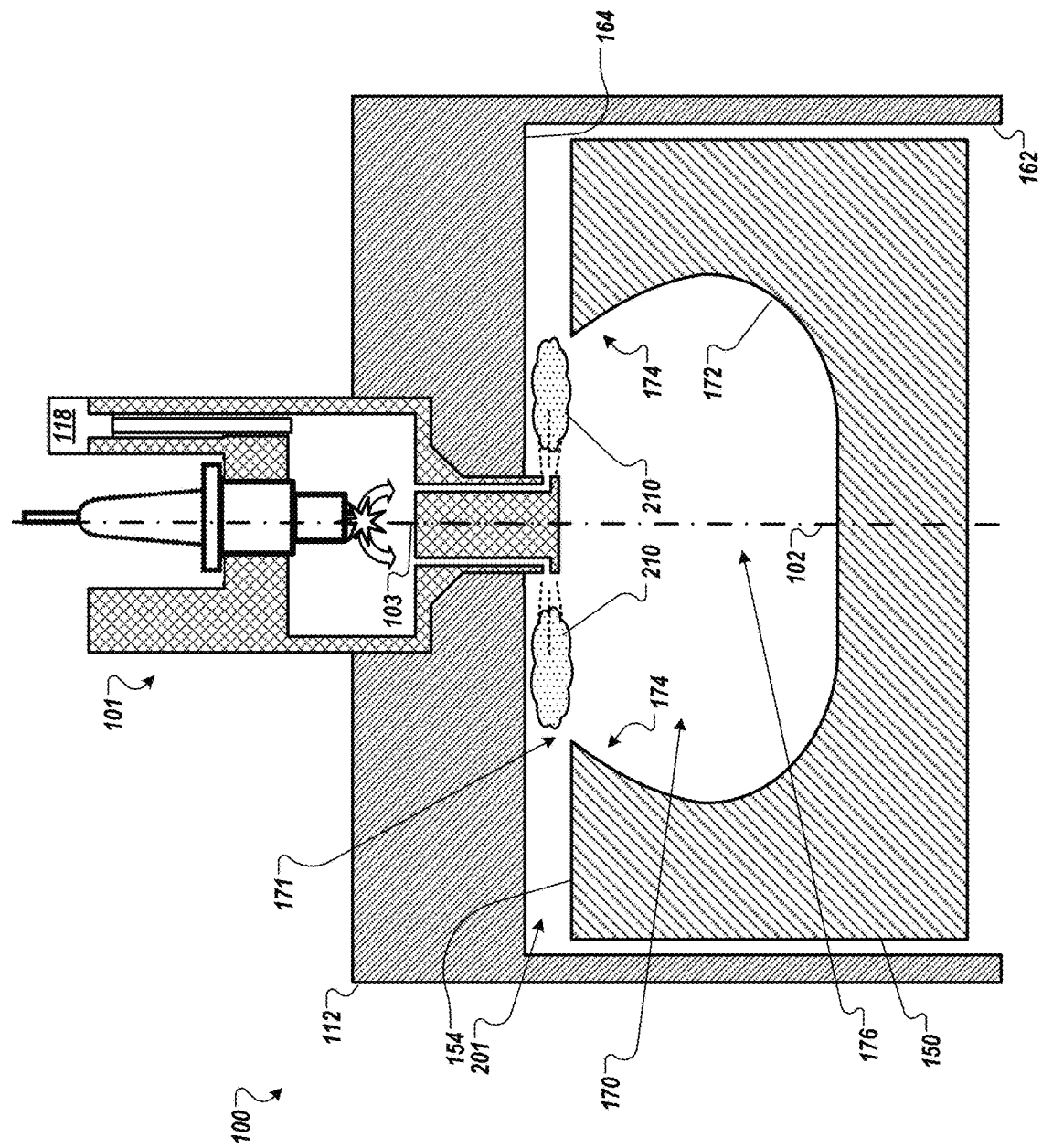

FLAME TRIGGERED AND CONTROLLED VOLUMETRIC IGNITION

TECHNICAL FIELD

This document describes internal combustion engines with ignition pre-chambers.

BACKGROUND

Engines are commonly operated on a lean air/fuel mixture to reduce generation of pollutants such as nitrous oxides (NOx). For example, natural gas engines can be run lean to reduce carbon dioxide and NOx emissions, but have high total hydrocarbon emissions (THC), especially methane (CH4) in the exhaust, while an oxidation catalyst can reduce most hydrocarbons, no effective methane reduction techniques are known for lean burn applications. Some natural gas engines run stoichiometric in order to utilize a three-way catalyst to reduce NOx, CO, and THC emissions, however such solutions historically negatively impact engine efficiency relative to lean burn engines.

SUMMARY

In general, this document describes internal combustion engines with ignition pre-chambers.

In one general aspect, a method of igniting an air/fuel mixture in an internal combustion engine includes receiving an air/fuel mixture into a pre-combustion chamber, the pre-combustion chamber enclosing a portion of an igniter, igniting the air/fuel mixture in in the pre-combustion chamber with the igniter to produce a flame, directing the flame to eject the pre-combustion chamber through a collection of passages in a wall of the pre-combustion chamber, toward a peripheral wall of a main combustion chamber of the internal combustion engine, igniting, by the flame, air/fuel mixture in the main combustion chamber adjacent the peripheral wall, and then igniting air/fuel mixture in the main combustion chamber in a central region of the main combustion chamber with a propagating flame front of the ignited air/fuel mixture or a portion of the directed flame adjacent the peripheral wall.

Various embodiments can have some, all, or none of the following features. The main combustion chamber can include a bowl defined in a face of a piston of the internal combustion engine with the face and the bowl at a first end, an elongate cylindrical chamber having a cylindrical wall, and a cylinder head at a second end opposite the first end, the bowl having a wall that is at least partly curved or angled, and a portion of the bowl wall adjacent the ejected flame has an orientation that is obtuse to a trajectory of the ejected flame, and wherein the method further comprises moving the piston proximal a top dead center position wherein a portion of the wall extends into the bowl, and the bowl extends circumferentially around a portion of the wall. All air/fuel mixture received in the pre-combustion chamber can be received from the main combustion chamber. Directing the flame to eject the pre-combustion chamber through the collection of passages in a wall of the pre-combustion chamber, toward the peripheral wall of the main combustion chamber of the internal combustion engine can also include ejecting the flame orthogonal to a cylinder wall of the main combustion chamber more laterally than axially. Each of the passages can have a width, and each of the passages can have a length that is at least an order of magnitude greater than the width. The method can also include receiving, from a pressure sensor in the pre-combustion chamber and configured to measure fluid pressure in the pre-combustion chamber and the main combustion chamber, a pressure signal, and adjusting ignition timing of the engine based on the pressure signal such that CA50 to CA90 is shorter than CA10 to CA50. The method can also include compressing, by the propagating flame front propagating from the peripheral wall toward a central region of the combustion chamber, unburned air/fuel mixture in the central region, and auto-igniting unburned air/fuel mixture in the central region, where later portions of mass fraction burned (MFB) rate are faster than the propagating flame front initial MFB rates. The method can also include receiving, from a pressure sensor in the pre-combustion chamber or main combustion chamber and configured to measure fluid pressure in the pre-combustion chamber and the main combustion chamber, a pressure signal, and adjusting ignition timing of the engine, in the next combustion cycle after the pressure signal is received, based on the pressure signal such that about 85% of the heat release (HR) occurs by a predetermined point about 20 degrees after top dead center.

In another general aspect, a system for igniting a mixture in an internal combustion engine includes an igniter, a pre-combustion chamber enclosing a portion of the igniter, a main combustion chamber having a peripheral wall, and a collection of passages in a wall of the pre-combustion chamber, each passage fluidly connecting the pre-combustion chamber and the main combustion chamber and having a jet aperture configured to direct fluid flow from the passage toward the peripheral wall more laterally than axially.

Various embodiments can include some, all, or none of the following features. The main combustion chamber can include a bowl defined in a face of a piston of the internal combustion engine with the face and the bowl at a first end, an elongate cylindrical chamber having a cylindrical wall, and a cylinder head at a second end opposite the first end, the bowl having a wall that is at least partly curved or angled, and a portion of the bowl wall adjacent the ejected flame has an orientation that is obtuse to a trajectory of the ejected flame. The pre-combustion chamber can also include a nose that defines the collection of passages. The jet apertures of the collection of passages can be arranged radially. The jet apertures of the collection of passages can be arranged to direct flame, ejected from pre-combustion chamber through the collection of passages, orthogonal to a cylinder wall of the engine. Each of the passages can have a width, and each of the passages can have a length that is at least an order of magnitude greater than the width. The pre-combustion chamber can be configured to receive air/fuel mixture, the igniter can be configured to ignite air/fuel mixture in the pre-combustion chamber to produce a flame, and the collection of passages can be configured to direct the flame to eject the pre-combustion chamber through the jet apertures in a wall of the pre-combustion chamber, toward the peripheral wall of the main combustion chamber. The peripheral wall of the main combustion chamber can be configured to receive a portion of the flame ejected from the jet apertures, and redirect the portion such that air/fuel mixture in the main combustion chamber proximal the peripheral wall is ignited by the portion, and then air/fuel mixture proximal a central region of the main combustion chamber is ignited by flame proximal the peripheral wall. The system can also include a pressure sensor in the pre-combustion chamber or main combustion chamber configured to provide a pressure signal representative of a fluid pressure in the pre-combustion chamber and the main combustion chamber. The system can also include a controller configured to adjust activation of the igniter based on the pressure signal such that CA50 to CA90 is shorter than CA10 to CA50. The system can also include a controller configured to adjust activation of the igniter based on the pressure signal such that about 85% of the heat release (HR) occurs by about 20 degrees after top dead center.

In another general aspect, an internal combustion engine includes an igniter, an enclosure receiving the igniter, the enclosure defining a pre-combustion chamber enclosing a portion of the igniter, a main combustion chamber having a peripheral wall, and a collection of passages in a wall of the pre-combustion chamber, each passage fluidly connecting the pre-combustion chamber and the main combustion chamber and having a jet aperture configured to direct fluid flow from the passage toward the peripheral wall more laterally than axially. The main combustion chamber can include an elongate cylindrical chamber having a cylindrical wall, a bowl defined in a face of a piston at a first end, and a cylinder head at a second end opposite the first end, wherein the peripheral wall is at least partly curved or angled, a portion of the peripheral wall adjacent the jet aperture has an orientation that is complimentary to a trajectory of fluid flow based on the configuration of the jet aperture, and a portion of the wall is configured to partly extend into the main combustion chamber when the piston is near top dead center. The peripheral wall can be configured to receive a flame ejected from the jet apertures, and redirect a portion of the flame such that air/fuel mixture in the main combustion chamber proximal the peripheral wall is ignited by the portion, and then air/fuel mixture proximal a central region of the main combustion chamber is ignited by flame proximal the peripheral wall. Each of the passages can have a width, and each of the passages can have a length that is at least an order of magnitude greater than the width. The jet apertures of the collection of passages can be arranged radially. The jet apertures of the collection of passages are arranged to direct flame ejected from pre-combustion chamber through the collection of passages orthogonal to a cylinder wall of the engine. The engine can also include a pressure sensor configured to provide a pressure signal representative of a fluid pressure in the pre-combustion chamber and fluid pressure in the main combustion chamber. The engine can also include a controller configured to adjust activation of the igniter based on the pressure signal such that CA50 to CA90 is shorter than CA10 to CA50. The engine can also include a controller configured to adjust activation of the igniter based on the pressure signal such that about 85% of the heat release (HR) occurs by about 20 degrees after top dead center.

The systems and techniques described here may provide one or more of the following advantages. First, a system can provide a means to consistently (cycle to cycle), temporally (in time) and spatially (in the right place in the combustion chamber) generate and control conditions for auto-ignition in an internal combustion engine, the benefits of which are (a) faster burn and shorter burn durations (b) operation in the previously "knock-forbidden zone"—i.e. more advanced combustion phasing or higher compression ratio—by virtue of replacing the stochastic nature of engine knock (characterized by isolated pockets of gas in the periphery along the outer edge of the piston near the liner) with a deterministic "group" auto-ignition behavior—where auto-ignition is achieved without engine knock or pressure oscillations which normally characterize engine knocking, thus enabling well known efficiency improvers—short burn duration, optimal forward combustion phasing, and high compression ratio—even at above normal power density levels (BMEP) to achieve new standards in engine efficiency, especially for stoichiometric engines with TWC emissions controls. These benefits are achieved by virtue of (1) a prechamber with low cycle to cycle variability which directs the flame jets to the periphery—thus enabling a burn from the outside in flame structure, (2) a piston bowl design—which has maximal clearance (and minimal squish) in the piston land region—such that the flame jets can burn without heat losses and quenching to the head and piston, and the prechamber generates sufficient turbulence that squish turbulence is no longer need, and which due to the flame from the outside in, creates a collectivication of the unburned gases into a confined and combined group space, in such a way that when auto-ignition is triggered, it is a volumetric group event as all candidate "auto-ignition zones" will be so closely coupled that they will all ignite spontaneously at essentially the same time, thus producing a high intensity auto-ignition event that burns up all the AI candidates, and raises the cylinder pressure at the end of the burn rather than at the beginning (like the delta function of RCCI or HCCI), and (3) cylinder pressure based combustion feedback (RT-CDC) controller and algorithm which enables fast computation of the combustion metrics such as CA50 (center of combustion), burn duration, and a user defined X2 (MFB-X2) where X2 is set to a number between 50% and 90% of MFB to capture the time at which the auto-ignition event occurs and to use fast closed loop control to maintain the user defined "time at which X % of the MFB occurs", The controlled "bowl volumetric auto-ignition" is triggered by the propagating flame (which burns from the outside in towards the bowl) such that the candidate auto-ignition gases are compressed by the propagating flame heat release and subsequent pressure rise, which leads to the acceleration of the auto-ignition chemistry. The ideal result is a triangularly shaped heat release rate, where the second ½ of the burn rate is faster than at any point in the first have, which achieves a fast rise in the cylinder pressure, such that the peak of the heat release is near the end of the burn duration and the peak of the pressure is largely co-incident with the peak of the heat release rate (which is not true for bell shaped, Gaussian style heat release rates, where the slowest combustion is at the end of the burn duration.

The details of one or more implementations are set forth in the accompanying drawings and the description below. Other features and advantages will be apparent from the description and drawings, and from the claims.

DESCRIPTION OF DRAWINGS

FIGS. 2A and 2B are schematic diagrams that show a partial cross-section of an example of combustion in the internal combustion engine of FIGS. 1A-1E, according to some embodiments.

DETAILED DESCRIPTION

Figure 1A:
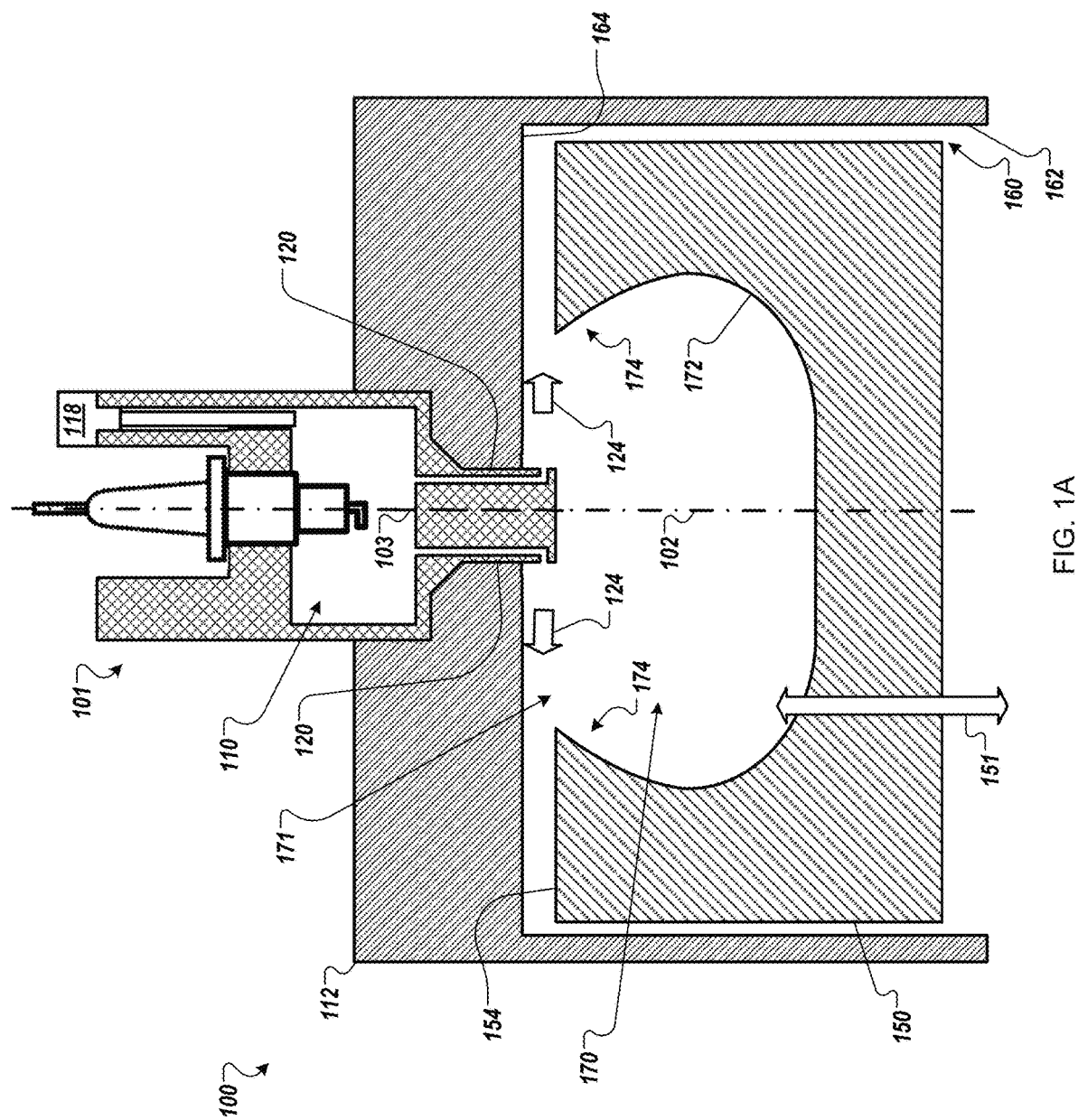
FIG. 1A is a schematic diagram that shows a partial cross-section of an example internal combustion engine with an ignition pre-combustion chamber, according to some embodiments.

This document describes systems and techniques for reducing emissions, increasing power density, and improving efficiency in reciprocating internal combustion engines. The concepts described herein encompass both combustion chamber topologies and control techniques that facilitate the combustion improvements. Increasingly restrictive limits on oxides of nitrogen (NOx) levels and desire for low hydrocarbon emissions, especially methane, are driving the change from lean-burn to stoichiometric combustion strategies in order to take advantage of inexpensive and highly effective catalyst technology. The change to stoichiometric combustion historically limits the power density of an engine due to engine knock caused by higher in-cylinder temperatures. To suppress engine knock, exhaust gas recirculation (EGR) rates from 10 to 30% are used. While high EGR rates nominally improve brake thermal efficiency (BTE) and reduce exhaust gas temperatures, they also slow down combustion. To counteract the slow combustion due to high levels of EGR, a controlled ignition triggered homogeneous charge volumetric ignition process is created, resulting in very short burn durations, which can be achieved without the destructive effects of engine knocking or excessive cylinder pressure due to combustion controls, leading towards high efficiency gas engines.

In general, engine efficiency is improved by the use of a combustion process and engine configuration in which an air/fuel mixture is ignited in a prechamber and the prechamber turbulent flame reactant jets are delivered into the center of the combustion chamber or into a dish type piston shape similar to the way diesel fuel is sprayed into a combustion chamber. The system disclosed herein, however, deviates from known systems; for example, since the "end gas" (air/fuel mixture remaining uncombusted near the end of the combustion cycle, typically located near the periphery of the cylinder) is usually the source of stochastic auto-ignition and thus the source of engine knocking, the flame jets in this system are sent horizontally, directly to the "end gas" in order to burn up the heretofore knocking raw ingredients (e.g., like fire fighters starting a fire ahead of the flame so it will burn backwards toward the center) such that the ignited flame jet mixture is ejected toward the periphery of the cylinder. The ignited mixture ignites an air/fuel mixture in the main combustion chamber, starting near the cylinder walls first and then propagating inward, away from the walls and toward the center of the main combustion chamber. With the burn from the outside in technique, enabled by the horizontal prechamber jets, the "end gas" becomes trapped in the piston bowl and grouped together such that once any portion of it auto-ignites ahead of the inwardly propagating flame, the entire soup pot of reactants will go off (ignite) all at once. This grouped volumetric auto-ignition generates a single combustion event with very fast combustion, in contrast to the historical burn from the center out which leads to isolated pockets which go off stochastically and without union, leading to the damaging pressure oscillation of knock and to increased heat transfer to the most vulnerable portion of the piston the piston land. Additionally, in historical knock the least cooled portion of the piston (e.g., next to the rings) gets the extra heating which leads to overheating pistons, which can crack or expand and seize within the cylinder liner. In the burn from the outside in technique, the end gas goes off all at once (e.g., no pressure oscillation waves) and excess heat is transferred to the piston bowl which can be cooled (e.g., in some embodiments, the piston bowl can include an oil jet on the back side for cooling and to resist damage to the piston and a thermal barrier coating can also be added easily to the piston bowl). In some embodiments, engine efficiency can be increased, for example, by the shorter burn duration (e.g., second ½ of the mass fraction burned (MFB) takes less time than the first ½), the forward combustion phasing, by use of a high compression ratios (e.g., 12:1 to 15:1), and by burning up historically hard to burn CH4, the energy of which can contribute to the heat release and efficiency, and not wasted in the exhaust stream, while catalyzing the remaining emissions, thus achieving zero or near-zero emissions (total hydrocarbon emissions (THC), NOx, CO), at a point able to reach a $CO_2$ equivalent greenhouse gas (GHG) emission of less than about 500 g/kWh. The concepts herein are especially useful in gaseous fueled engines, including natural gas fueled engines, but are equally applicable to other fuels, including liquid fuels.

FIGS. 1A-1D are schematic diagrams that show partial cross-section views of an example of an internal combustion engine 100 with a pre-combustion chamber 110, according to some embodiments. In certain instances, the engine 100 is a four-cycle reciprocating engine, although the concepts herein are relevant to other configurations of reciprocating engines. The engine 100 includes a cylinder 160 having a center axis 102 and a piston 150 configured for reciprocal movement along the axis 102.

Figure 1B:
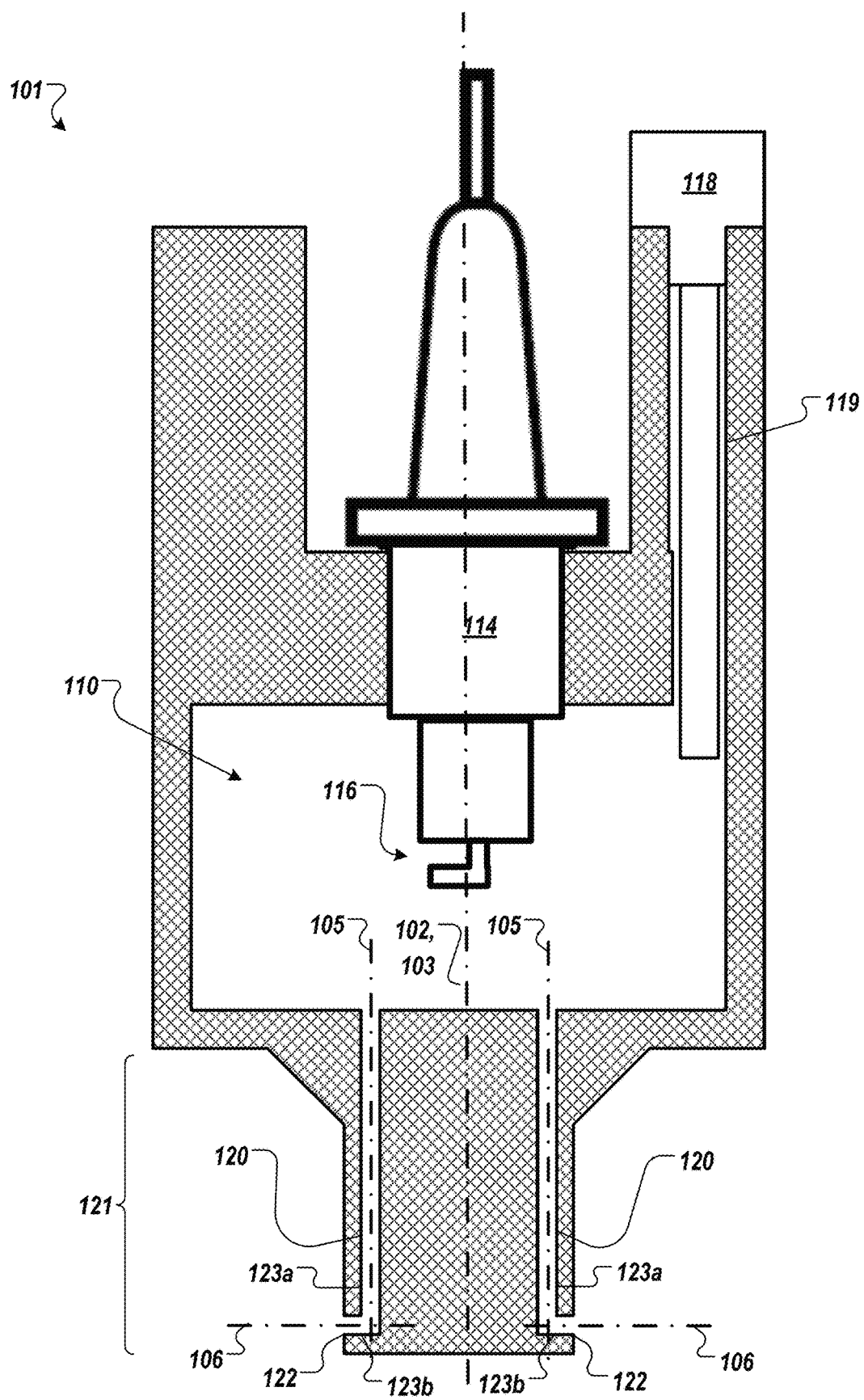
FIG. 1B shows an enlarged half cross-sectional view of the example pre-combustion chamber of FIG. 1A.

Referring to FIG. 1B, in the illustrated example the pre-combustion chamber 110 is defined within a pre-combustion igniter carrier 101 (e.g., an enclosure). The pre-combustion igniter carrier 101 is configured to mount in a cylinder head 112. In other instances, the pre-combustion chamber 110 can be formed directly in the cylinder head 112 or elsewhere proximate the main combustion chamber.

An igniter 114 (e.g., spark plug such as M10, M12, M14, M18, glow plug, laser igniter, hot surface igniter, or other type of igniter including diesel nanopilot) extends partly into the pre-combustion chamber 110 and defines an ignition location 116 (e.g., spark plug gap, laser focus location, hot surface or other ignition location including diesel nanopilot) within the pre-combustion chamber 110. A collection of tubular passages 120 extend from the pre-combustion chamber 110. In the illustrated example, the passages 120 are partly defined within a nose 121 (e.g., an end wall) of the pre-combustion chamber 110. In certain instances, there are four passages 120 equally, circumferentially spaced around the nose 121, but fewer or more could be provided.

The igniter carrier 101 also includes a pressure sensor 118. The pressure sensor 118 is in fluid communication with the pre-combustion chamber 110 through a passage 119 defined by the igniter carrier 101. In use, the pressure sensor 118 can sense the pressure of gasses within the pre-combustion chamber 110, as will be discussed further in the description of FIG. 2B.

The piston 150 is configured for reciprocal movement (as represented by arrow 151) within the cylinder 160. The cylinder 160 has a peripheral wall 162 and is capped with a cylinder head 164. A main combustion chamber 170 is the volume outside of the pre-combustion chamber 110, bounded by the peripheral wall 162 of the cylinder 160, the cylinder head 164, and the top of the piston 150 (above the piston's compression rings).

In certain instances, the piston 150 includes an ovoid bowl 171 with a peripheral wall 172 that is curved or angled. The center axis 102 of the cylinder 160 coincides with a center axis of the piston 150 and, in certain instances, the bowl 171 is centered on and wholly symmetric about that center axis (and in some instances it is not). The collection of passages 120 extend into the main combustion chamber 170 and proximal to the bowl 171 when the piston 150 is at or near top dead center (TDC). At the ends of the passages 120 proximal the main combustion chamber 170, the passages 120 include jet apertures 122 (e.g., openings, nozzles, ejection ports) oriented toward a proximal portion 174 of the peripheral wall 172. The jet apertures 122 are configured to provide a substantially radial distribution (e.g., spray) of flame ejected from the pre-chamber 110 toward the periphery of the cylinder 160, along a trajectory represented by arrows 124, which will be described in more detail in the descriptions of FIGS. 1C and 2. In some embodiments, the trajectories 124 are substantially orthogonal to the peripheral wall 162. In certain instances, the piston 150 can have a different shape and be provided without a bowl, for example, being flat, upwardly or downwardly domed, or have another shape.

The passages 120 include two sections, a major section 123a and a minor section 123b. The major sections 123a are generally elongate (e.g., tubular) in shape, each having a width and each having a length, along a major axis 105 (on which the major section 123a of the passage is centered), that is substantially (e.g., an order of magnitude) greater than the width (e.g., 2×, 5×, 10×, 50× longer than wide). The major axes 105 of the major sections 123a are parallel to the center axis 102 of the cylinder 160. The major sections 123a are also offset from the location of the ignition location 116 (e.g., the main tubular portions of the passages do not point toward the ignition location 116). The minor sections 123b are generally elongate (e.g., tubular) in shape, each having a width and each having a length, along an axis 106. The axes 106 extend perpendicular to the major axes 105, the center axis 103 of the chamber 110, and the peripheral wall 162.

The jet apertures 122 each have a center axis, and in some instances these axes can be oriented substantially orthogonal to the peripheral wall 162 and/or substantially perpendicular to the center axis 102 of the cylinder 160. The ratio of length to width, the orientation, and other geometrical properties of the passages 120 are also configured to promote efficient evacuation of the pre-combustion chamber 110. The major sections 123a and the minor sections 123b have different lengths, shapes, and aspect ratios. The major sections 123a are sufficiently long enough (e.g., 2×, 5×, 10×, 50× longer than wide) to collimate fluid flow around the center axis 105 of the passage 102, and can have a generally circular cross section (e.g., 1:1 aspect ratio), while the minor sections 123b can have lengths and aspect ratios (e.g., 2:1, 3:1, 4:1) that promote ejection of flame along the trajectories 124 in a pattern that projects a portion of flame across the face 154 to the peripheral wall 162 (e.g., a fan pattern that is substantially co-planar to the face 154.

Figure 1C:
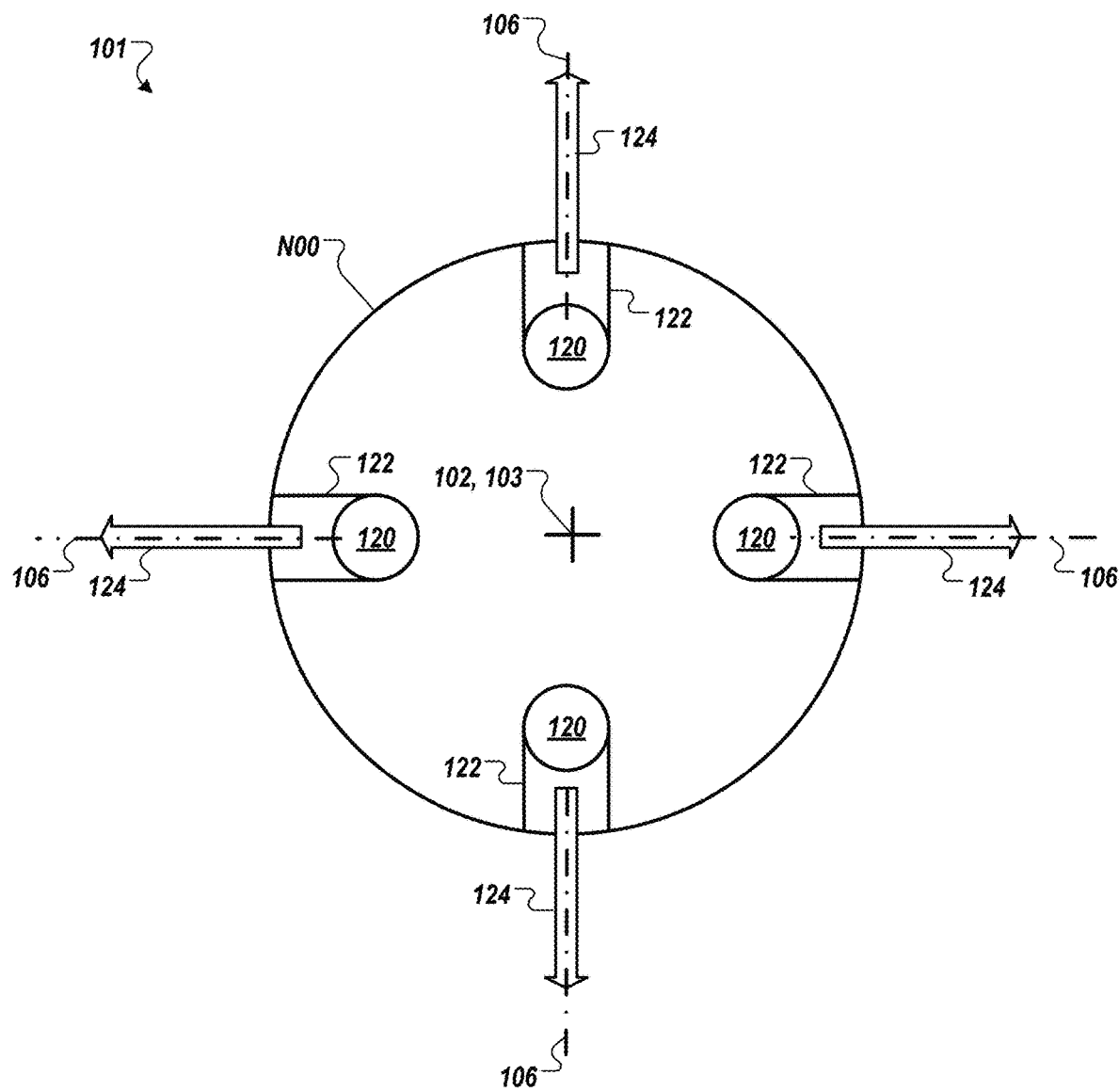
FIG. 1C shows an enlarged bottom cross-sectional view of the nose of FIG. 1B.

FIG. 1C shows an enlarged sectional end view of the nose 121. As shown in this view, the passages 120 are offset laterally from the axis 103. As also shown in this view, the passages 120 fluidly connect to the jet apertures 122, and the jet apertures 122 are oriented away from (e.g., perpendicular to) the axis 103. During pre-combustion, flame is expelled in a radially outward pattern, away from the axis 103 and orthogonal to the center axis 102 (e.g., and the peripheral wall 162) of the cylinder.

Figure 1D:
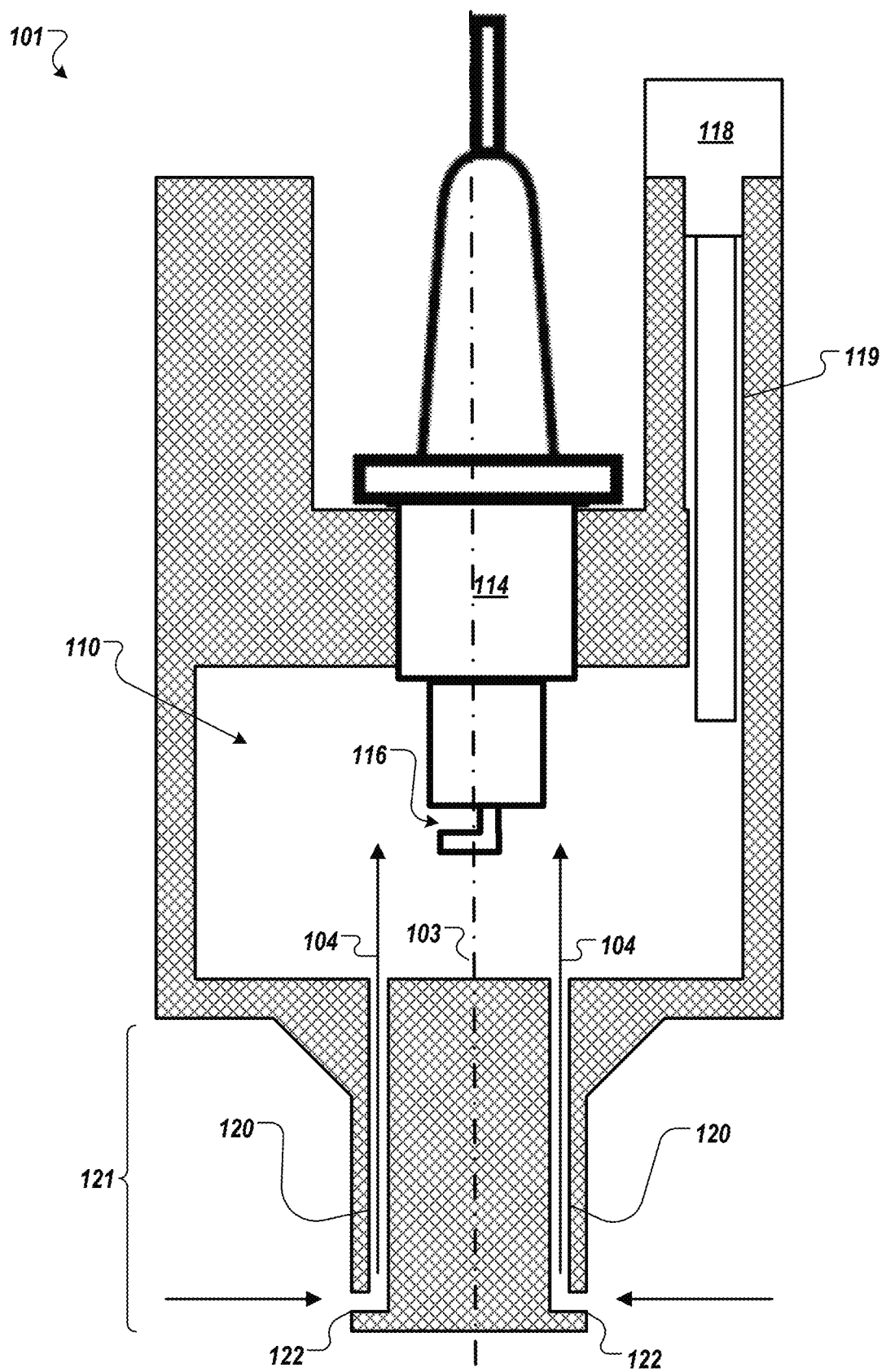
FIG. 1D shows an enlarged cross-sectional view of the example igniter carrier of FIG. 1A during compression.

Referring to FIG. 1D, the ratio of length to width, the orientation, and other geometrical properties of the passages 120 is also configured to reduce turbulence of air/fuel mixture near the ignition location 116. The configuration of the passages 120 causes inflow of air/fuel mixture (e.g., during compression strokes), as represented by arrows 104, to the pre-combustion chamber 110 to not flow directly toward the ignition location 116 so incoming air/fuel mixture does not impinge on the ignition location 116. For example, the length, width, and aspect ratio of each major section 123a can be selected to promote a collimated flow of incoming air/fuel mixture, and the orientations of the major sections 123a can be configured so the collimated incoming flow does not align with the ignition location 116. As shown in the illustrated example, none of the passages 120 are oriented or otherwise configured to cause incoming flows to impinge on the ignition location 116.

In some embodiments, the inflow 104 can impinge upon a wall of the pre-combustion chamber 110 before propagating into and around the ignition location 116. This arrangement places the ignition location 116 in a quiescent region of relatively low flow and turbulence, relative to the higher flow and turbulence that occurs in the trajectories of the flow from the passages 120 during compression. The turbulent areas can help purge residuals from crevices (e.g., in a spark plug between the ceramic and shell). As such, a flame kernel can develop and grow within the ignition location 116 with a reduced likelihood off extinguishment (e.g., blowout) due to turbulence caused by the inflows 104, and the nearby turbulence can help accelerate pre-combustion after the kernel has grown large enough.

Figure 1E:
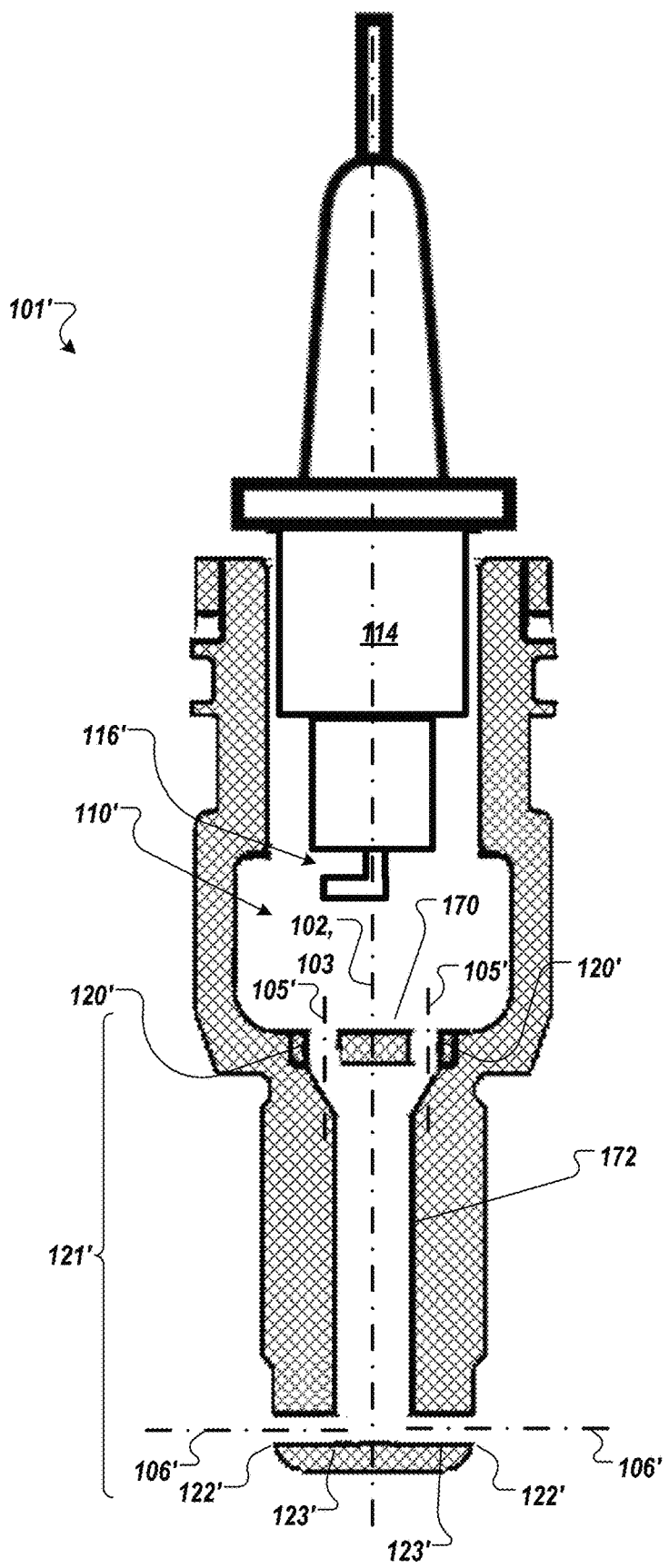
FIG. 1E shows an enlarged half cross-sectional view of another example igniter carrier.

FIG. 1E shows an enlarged half cross-sectional view of another example igniter carrier 101'. In some embodiments, the igniter carrier 101' can be used in the engine 100 in place of the igniter carrier 101. In the illustrated example, a pre-combustion chamber 110' is defined within the pre-combustion igniter carrier 101' (e.g., an enclosure), and the pre-combustion igniter carrier 101' is configured to mount in the cylinder head 112. In other instances, the pre-combustion chamber 110' can be formed directly in the cylinder head 112 or elsewhere proximate the main combustion chamber. The pre-combustion chamber 110' is configured to have a cross section that is substantially rectangular, and shaped to create toroidal vortex flow within the chamber 110' that is centered around the center axis 103 of the chamber 110' and circulates from the top to bottom of the chamber 110'. In some embodiments, the ratio of volume of the pre-combustion chamber 110' to the swept volume of the cylinder ($V_{pc}/V_{swept}$) can be in a range of about 800-1200.

The igniter 114 extends partly into the pre-combustion chamber 110' and defines an ignition location 116' (e.g., spark plug gap, laser focus location, hot surface or other ignition location including diesel nanopilot) within the pre-combustion chamber 110'. A collection of tubular passages 120' extend from the pre-combustion chamber 110' through a disk 170 that partly defines a sidewall of the pre-combustion chamber 110'. In some embodiments, the ratio width of the pre-combustion chamber 110' to the diameter of the disk 170 can be in a range of about 1.2 to about 2.0 In certain instances, there are four passages 120' equally, circumferentially spaced around the disk 170, but fewer or more (e.g., 2, 6, 8, 10) could be provided. The tubular passages 120' are generally elongate (e.g., tubular) in shape, each having a width (e.g., ~1.1 to 1.9 mm diameter) and each having a length, along a major axis 105'. In some embodiments, the ratio of chamber volume to disk hole area can be about 100-200 $mm^3/mm^2$.

A tubular passage 172 is partly defined within a nose 121' (e.g., an end wall) of the igniter carrier 101'. The tubular passage 172 extends from the disk 170 to a collection of tubular passages 123' near the end of the nose 121' opposite the chamber 110'. The tubular passage 172 is generally elongate in shape, having a width and each having a length, along the chamber center axis 103', that is substantially (e.g., an order of magnitude) greater than the width (e.g., 2×, 5×, 10×, 50× longer than wide). The tubular passages 123' are generally elongate in shape, each having a width and each having a length, along an axis 106'. In the illustrated example, the axes 106' extend perpendicular to the major axes 105', the center axis 103', and the peripheral wall 162, while in some embodiments the tubular passages may be angled (e.g., +/− about 30 degrees away from perpendicular).

In the illustrated example, the major axes 105' of the tubular passages 120' are parallel to the center axis 102 of the cylinder 160 and the center axis 103 of the chamber 110'. In some embodiments, the tubular passages 120' can point to the ignition location 116'. For example, some or all of the tubular passages 120' can be straight or angled up to about +30 degrees to promote the removal of hot residuals. In some embodiments, the tubular passages 120' can be configured with a helical orientation (e.g., in a helix, twisting circumferentially around the center axis 103 to promote a swirl of fluids entering the chamber 110' or the tubular passage 172 through the passages 120').

The tubular passages 120' are also offset from the location of the ignition location 116' (e.g., the main tubular portions of the passages do not point toward the ignition location 116'). In some embodiments, radial distance from a center axis 103 of the chamber 110' to the major axes 105' can range from about 2 mm to 4 mm (e.g., radial distance R is a range of about 2 mm<R<$R_{rethread}$−2 mm).

The nose 121' and the passage 172 extends into the main combustion chamber 170 and proximal to the bowl 171 when the piston 150 is at or near top dead center (TDC). The passage 172 is defined to have a channel passage area that is greater than the total combined area of the passages 120', but less than about 1.5 times the total combined area of the passages 120'. At the ends of the passages 123' proximal the main combustion chamber 170, the passages 123' include jet apertures 122' (e.g., openings, nozzles, ejection ports) oriented toward the proximal portion 174 of the peripheral wall 172. The jet apertures 122' are configured to provide a substantially radial distribution (e.g., spray) of flame ejected from the pre-chamber 110' toward the periphery of the cylinder 160, along the trajectory 124.

The ratio of length to width, the orientation, and other geometrical properties of the passages 120', the passage 170, the passages 123', and the jet apertures 122' also configured to promote efficient evacuation of the pre-combustion chamber 110'. The passages 120' are configured to direct fluid flow ignition location 116', and can have a generally circular cross section (e.g., 1:1 aspect ratio), while the passages 123' can have lengths and aspect ratios (e.g., 2:1, 3:1, 4:1) that promote ejection of flame along the trajectories 124 in a pattern that projects a portion of flame across the face 154 to the peripheral wall 162 (e.g., a fan pattern that is substantially co-planar to the face 154.

In some embodiments, the igniter carrier 101' can also include a pressure sensor (e.g., the pressure sensor 118) in fluid communication with the pre-combustion chamber 110', which can be used to sense the pressure of gasses within the pre-combustion chamber 110', as will be discussed further in the description of FIG. 2B.

Figure 2B:
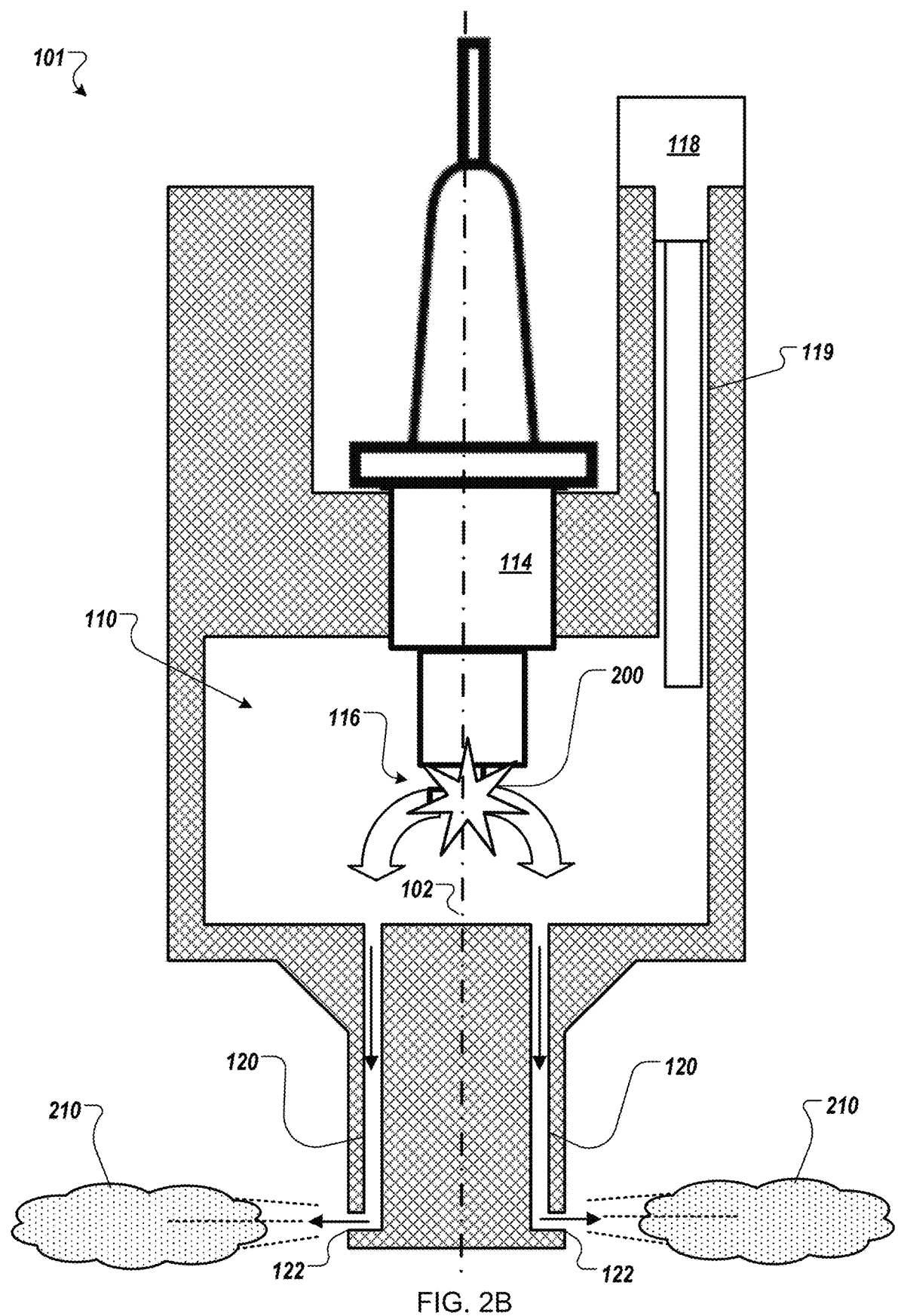

FIGS. 2A-4 are schematic diagrams that show an example of combustion in the internal combustion engine 100 of FIG. 1, according to some embodiments. FIGS. 2A and 2B shows an initial stage of combustion in the internal combustion engine 100.

Referring to FIG. 2B, an air/fuel mixture is provided to the pre-combustion chamber 110 (see, e.g., FIG. 1D). In some embodiments, the pre-combustion chamber 110 is a passive pre-combustion chamber, meaning the entire air/fuel mixture received into the pre-combustion chamber is provided to the pre-combustion chamber 110 from the main combustion chamber 170. For example, an air and fuel can be provided into the main combustion chamber 170, pre-mixed by a process or carburation or fuel injection, and as the piston 150 moves during a compression stroke, a portion of the air/fuel mixture will be pushed into the pre-combustion chamber 110 through the passages 120. In some embodiments, the pre-combustion chamber 110 is an active pre-combustion chamber or partially active pre-combustion chamber, meaning some or all of the fuel is provided to the pre-combustion chamber 110 directly. For example, the pre-combustion chamber 110 can be provided with fuel supply (e.g., an injector) that is in addition to the supply provided to the main combustion chamber.

In the illustrated example, the fuel is natural gas (NG), but in some embodiments other fuels or combinations of fuels can be used, such as diesel, gasoline, kerosene, hydrogen, biogas, or any other appropriate fuel (e.g., or fuels, in the case of a pilot or dual-fuel configuration). In some embodiments, the pre-combustion chamber can be provided with a different fuel or a different air/fuel mixture from that provided to the main combustion chamber. And in some configurations, the pre-combustion chambers 110, 110' may be fuel enriched with an injector or gas delivery tube opposite but similarly mounted like the pressure sensor.

The igniter 114 is configured to ignite combustion, forming a flame kernel 200 at the ignition location 116. The kernel 200 ignites the remaining air/fuel mixture and causes the air/fuel mixture to begin to combust and expand. The increasing pressure of the expanding, combusting mixture forces the combusting mixture out through the passages 120, which fluidly connect the pre-combustion chamber 110 and the main combustion chamber 170.

As discussed in the description of FIG. 1D, the pre-combustion chamber 110 is configured such that the ignition location 116 is located in a relatively quiescent region within the pre-combustion chamber 110, where there is relatively low fluid velocity and/or relatively low turbulence caused by the ingestion of the air/fuel mixture into the pre-combustion chamber 110 and/or combustion of the air/fuel mixture within the pre-combustion chamber. In the illustrated example, the ignition location 116 is located away from the passages 120 where relatively high fluid velocities may develop during compression and/or combustion (e.g., as expanding gasses escape through the passages 120). By arranging the ignition location 116 in a region of low turbulence and/or fluid velocity, the tendency to extinguish the burgeoning flame kernel can be reduced, which can improve the consistency of the ignition from cycle to cycle.

Referring now to FIG. 2A, as the expanding, combusting gasses travel through the passages 120, the jet apertures 122 cause the gasses to be ejected away horizontally in some embodiments, but also allows for "tilted" angles from 0 to 30 degrees from the cylinder head deck, from a center 176 of the main combustion chamber 170 as flaming jets 210. The flaming jets 210 project to or substantially to the peripheral wall 162 of the cylinder 160 above the piston land 150 (e.g., generally along the trajectories 124 shown in FIG. 1) and into a gap 201 between the piston land face 154 and the cylinder head 164. As the flaming jets 210 progress, some portion is captured by the proximal portions 174 of the peripheral wall 172 of the bowl 171 and some portions may be directed into the bowl 171. In some embodiments, the piston "squish" region may be sufficiently proportioned to enable the jet to mostly stay between the cylinder head 164 and the top of the piston land 150. The predetermined configuration and arrangement of the passages 120 promote good combustion stability (e.g., as discussed in the description of FIG. 1D) and fast jetting with a high level of diluent (e.g., exhaust gas recirculation or EGR).

In some embodiments, a thermal barrier coating can be provided on the piston 150, on the portion of the igniter carrier 101 extending into the main combustion chamber 170, and/or on the walls of the combustion pre-chamber 110 to reduce transfer of heat energy from combustion to the cylinder head 112, the piston 150, and/or the igniter carrier 101, and then reduce subsequent return of heat energy from these components back to air/fuel mixture in the main combustion chamber 170. For example, by reducing the heating of air/fuel mixture by residual heat in the combustion chamber, the occurrence of unintended auto-ignition (e.g., detonation, knock) and thermal run-away can be reduced. The design of the engine 100 can also reduce the amount of pumping work needed to deliver diluent.

Figure 3:
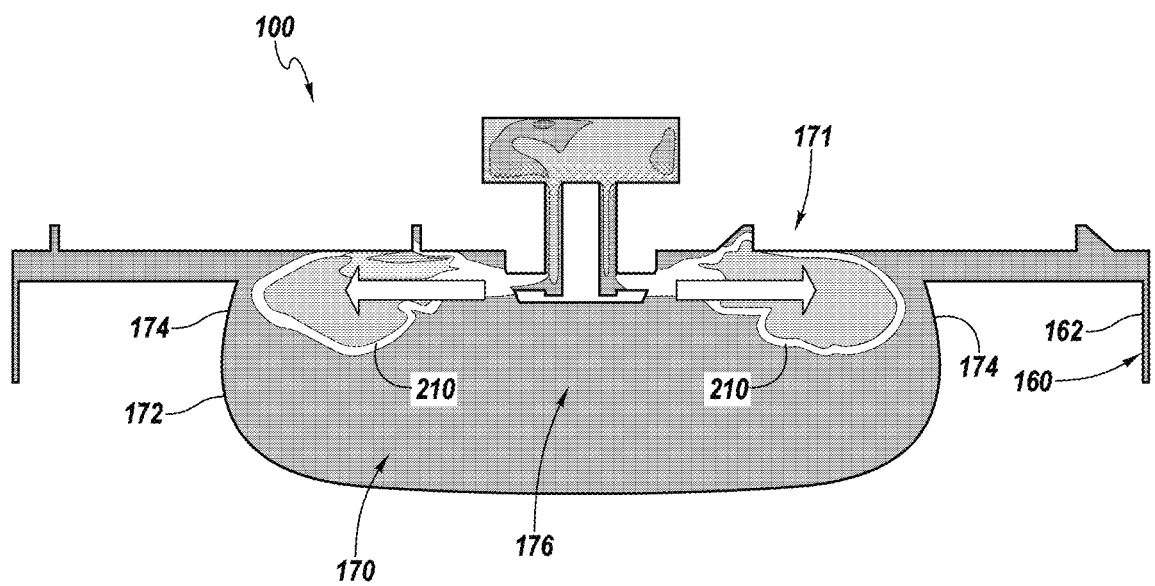
FIG. 3 shows an example thermal simulation of the propagation of ejected gasses and combustion of air/fuel mixture within the main combustion chamber.

Referring now to FIG. 3, an example of a thermal simulation of the propagation of the flaming jets 210 and combustion of air/fuel mixture within the main combustion chamber 170 is shown.

The proximal portions 174 of the bowl 171 are formed with angles or curvatures that are obtuse (e.g., are complimentary to) to the trajectories of a portion of the flows of the flaming jets 210 in order to redirect a portion of the flows along the peripheral wall 172. A portion of the flow of the flaming jets 210 reaches the periphery of the cylinder 160 and ignites air/fuel mixture in the region between the face 144 and the cylinder head 164. The peripheral wall 172 redirects another portion of the flow of the flaming jets 210 along the periphery of the bowl 171, causing portions of the air/fuel mixture in the bowl 171 near the peripheral wall 172 and peripheral wall 162, and away from the center 176, to ignite and combust first (e.g., at least partly before the air/fuel mixture near the center 176 ignites).

Figure 4:
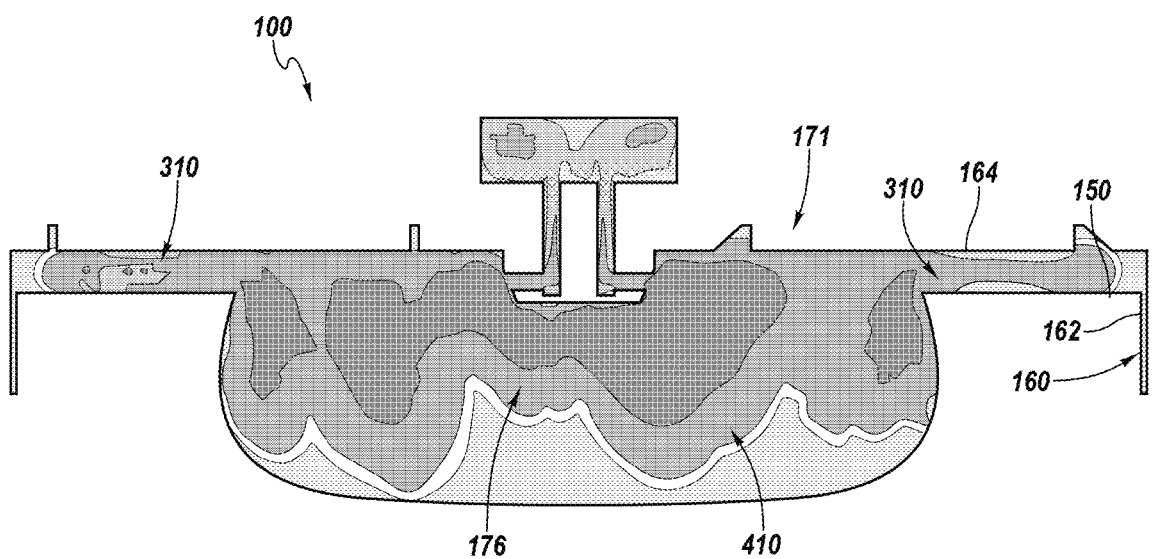
FIG. 4 shows an example thermal simulation of the propagation of combustion of air/fuel mixture within the main combustion chamber.

Referring now to FIG. 4, an example thermal simulation of the combustion of air/fuel mixture within the main combustion chamber 170 is shown. The combustion that occurs initially near the peripheral wall 172 and the peripheral wall 162 of the cylinder 160 in the gap between the face 154 and the cylinder head 164. Both of those regions burn and their flame fronts converge on the bowl 171, where the rising pressure increases the auto-ignition reaction rates—leading to auto-ignition precursors such as OH branching radicals (e.g. H2O2) which when reaching a critical temperature and radical population will undergo spontaneous OH branching thus burning the remaining air/fuel mixture in the bowl 171. Generally speaking, the main combustion chamber 170 burns from the outside in (e.g., propagating away from the peripheral wall 162 and the gap), and any uncombusted portions 410 of air/fuel mixture that has the potential to unintentionally auto ignite is collected in the bowl, where it is intentionally trapped and compressed by the propagating flame and is purposely auto-ignited, and thus burns rather quickly so it has little opportunity for traditional stochastic islands of auto-ignition which lead to knocking combustion, or if it does auto ignite it does so intentionally and all at once such it is not substantially detrimental due to the lack of any ringing in the combustion chamber that historically causes the destructive effects of stochastic uncontrolled auto-ignition and knock.

The main combustion chamber 170 has a predetermined shape that promotes the propagation of the flaming jets 210 directed about the periphery of the main combustion chamber, to ignite combustion near the peripheral wall 162 generally first so combustion near the center 176 happens as a generally secondary event. The shape of the main combustion chamber 170 is also predetermined in part to increase the efficiency and controllability of the combustion process. For example, the combustion can be caused to occur faster, especially in the second half of the heat release cycle. In the illustrated examples, the engine 100 is configured such that the angle span between second half of combustion, historically the slowest rate due to expanding piston, fuel near the walls, lower temperature and lower turbulence, CA50 (i.e., the crank angle where 50% mass fraction of the air/fuel mixture introduced into the combustion chamber is burned) and CA90 (90% mass fraction burned) is faster than the historically fast part of the combustion from CA10 (10% mass fraction burned) and CA50 (50% mass fraction burned). In other words, the engine 100 is configured to cause a large amount of the combustion to happen during a relatively short portion of the combustion cycle, and that short portion happens relatively late in the combustion cycle. (e.g., combustion happens faster during the last half of the cycle).

The combustion from the periphery of the cylinder 160 inward toward the center of the main combustion chamber helps control where auto-ignition occurs (i.e., toward the center of the main combustion chamber) so that efficiency and engine lifespan can be increased. The shape of the piston bowl 171, although optional, additionally helps control where auto-ignition occurs. For example, engine knock can damage pistons and cylinder walls (e.g., detonation near walls causes incremental damage that can lead to engine malfunction and/or failure), and in previous designs, knock is remedied or avoided by lowering compression and/or by selecting less favorable air/fuel ratios or retarding the combustion phasing (CA50). However, the design of the engine 100 promotes a controlled burn of the fuel near the periphery first, such that unburned fuel is concentrated near the center 176 at the time in the piston stroke when the combustion chamber pressures and temperatures are high and most conducive to unwanted auto-ignition, such that if and when auto-ignition does occur it happens near the center 176, away from the peripheral wall 172, and at a time and location near where the fuel would be intentionally ignited anyway. In other words, the regions near the peripheral walls 162 and 172 are combusted early so they cannot unintentionally auto-ignite later.

Figure 5:
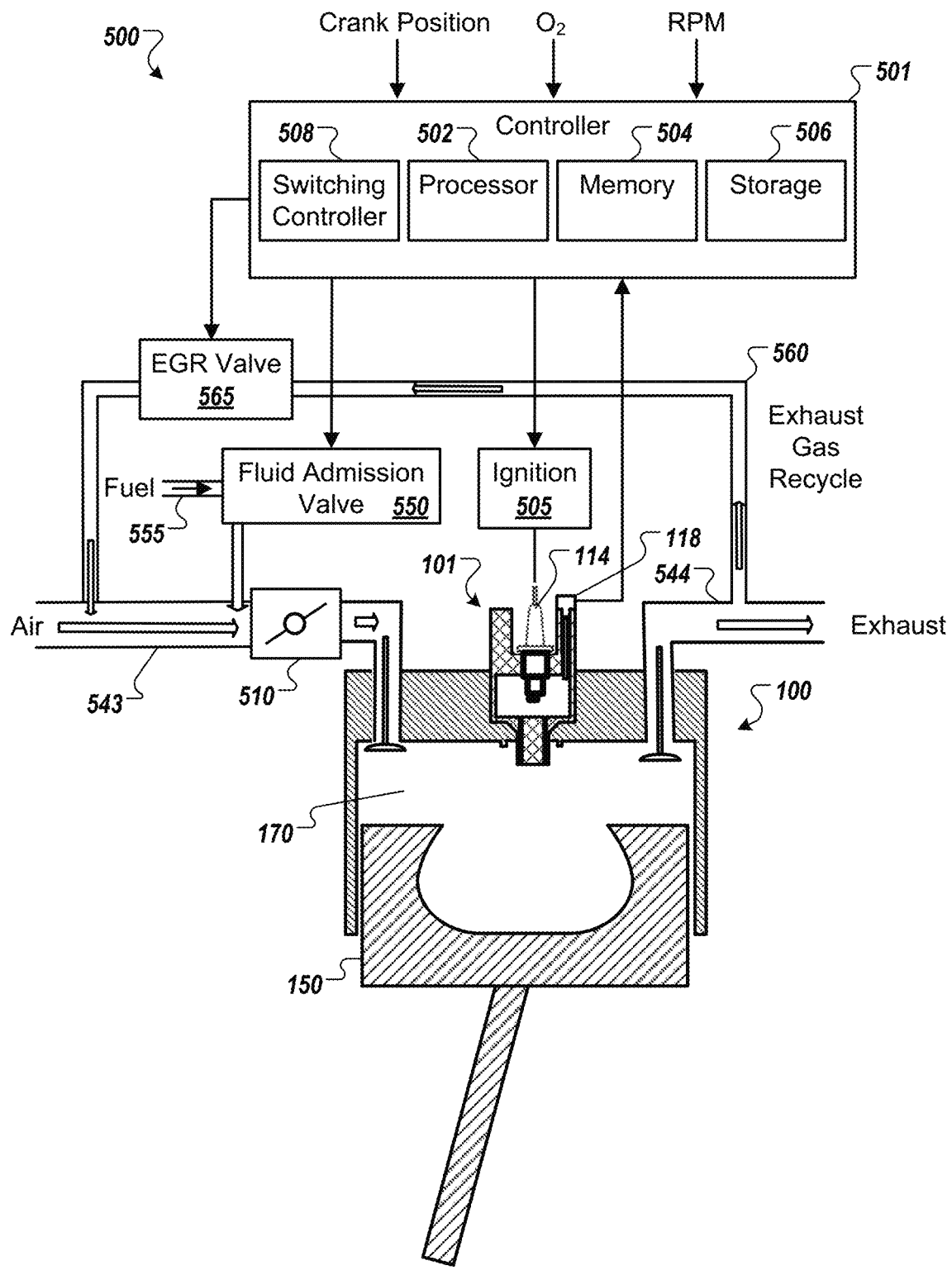
FIG. 5 is a schematic diagram that shows an example engine system, including a reciprocating engine, a fuel control, and an ignition control.

FIG. 5 is a schematic diagram that shows an example engine control system 500 for a reciprocating engine. The system 500 is an example of how the various components of FIGS. 1A-4 can be brought together with additional components for air, fuel, sensing, and control to form a comprehensive system that can be used to provide intelligent, pressure based control of an engine with reduced emissions, reduced heat transfer, and increased efficiency through combustion strategy and control, such as the engine 100.

A controller 501, such as an Engine Control Module (ECM), is a hysteretic current or voltage controller used to control the actuation or an air flow control valve 510 and a fluid admission valve 550 (e.g., a gas mixer). The fluid admission valve 550 is actuated by the controller 501 to control the flow of natural gas fuel or other appropriate fuel from a fuel conduit 555 to an air intake 543 (e.g., an inlet). The controller 501 is also used to control an exhaust gas recycle (EGR) valve 565 to control the flow of exhaust gasses from an outlet 544 though an EGR passage 560 to the air intake 543. In some embodiments, the EGR passage 560 can be configured with a venturi jet pump to draw the recycled exhaust gasses into the intake. By controlling the air flow, fluid admission valve 550 and the EGR valve 565, the controller 501 can control the amount of combustible natural gas that is supplied to the air intake 543. In other words, the controller 501 can control the fluid admission valve 550 so the fuel mixture provided to the main combustion chamber 170 has a controlled, predetermined air/fuel ratio. In some embodiments, the air/fuel ratio can be set nominally and very precisely lamba 1.0+/−0.01 (e.g., so that it feeds an appropriate mixture to a downstream catalytic converter).

The controller 501 also controls actuation of an ignition module 505. The ignition module 505 operates based on a signal from the controller 501 to energize the igniter 114 and ignite a combustion process (e.g., as discussed in the descriptions of FIGS. 3 and 4).

Combustion of fuel generates pressure within the pre-combustion chamber 110 and then by flame jets the main combustion chamber 170. Pressure within the pre-combustion chamber 110 and the main combustion chamber 170 is sensed by the pressure sensor 118, and pressure signals from the pressure sensor 118 are read and processed by the controller 501. In some embodiments, the pressure can be sensed directly from the main combustion chamber. In some embodiments, the system 500 can include a real-time combustion and diagnostics control (RT-CDC) system. The RT-CDC system can be used to monitor the combustion metrics and feed them to the controller 501 to use as smart sensor information for closed-loop control. In some examples, the center of combustion (CA50) can be monitored and sent to the controller 501, which in turn can be configured to adjust ignition timing to maintain a target CA value (e.g., CA50).

As such, the controller 501 is configured to control the timing of the ignition in real-time or near real-time, based on one or more measured variables such as pre-combustion pressure, main combustion pressure, crank position, air/fuel ratio, engine load, available oxygen (e.g., O2, elevation), engine speed (RPMs), temperature, fuel quality, compression ratio, EGR ratio, and any other appropriate variable of engine combustion. The controller 501 controls ignition to control the timing of the flaming jets 210 (as monitored by the pressure sensor 118) to control the combustion of fuel in the main combustion chamber 170 (as monitored by the pressure sensor 118) to achieve efficient combustion. The controller 501 can adjust the ignition timing and air/fuel mixture to shift the center of combustion (CA50) to optimize combustion. The controller can also use auto-ignition metrics to control the degree of auto-ignition, such as the difference between the 10-50 MFB and the 50-90 MFB ratios, the location of X2 MFB (nominally X2 is set to between 70% and 85% of the MFB), and adjust controllable factors to intentionally and consistently induce auto-ignition in the bowl.

During the combustion stroke, the controller 501 identifies a reference event such as TDC or a crank offset from TDC based on an engine crank sensor, or based on actuation of the ignition module 505. For example, as the air/fuel mixture in the pre-combustion chamber 110 combusts, gas pressures increase and then diminish in a wave. By adjusting the timing of the ignition, the controller 501 can control the timing of pre-chamber pressure and/or heat release rate (HRR) peak to control the timing of ejection of combusting gasses into the main combustion chamber 170. Using the pressure sensor 118, the controller 501 can confirm that the ejection of combusting gasses into the main combustion chamber 170 is occurring as expected, and if not, advance or retard the timing of the ignition signal to compensate for any lag/lead in the ejection of combusting gasses. In some embodiments, the ignition timing can be adjusted to cause the resulting ejection of combusting gasses to occur in a specified window before TDC (e.g., from about 3 degrees before TDC to about 5 degrees after TDC).

The controller 501 is also configured to take remedial measures to prevent engine damage when engine knock is identified (e.g., alter air/fuel ratio, alter ignition timing, reduce engine load, alter fuel injection timing, increase EGR rates). The controller 501 can also be configured to take other steps in the absence of detected engine knock. For example, the controller 501 may determine that more aggressive engine parameters can be applied in order to economize the consumption of fuel by the engine and/or to reduce emissions.

The controller 501 can be used for the operations described herein according to one implementation. The controller 501 includes a processor 502, a memory 504, a storage device 506, and switching controller 508. The processor 502 is capable of processing instructions for execution within the system 500. In one implementation, the processor 502 can be a field-programmable gate array (FPGA) processor. For example, with the advent of very fast FPGAs, it is possible to look carefully at the switching controller 508 logic and detect very small variations in current and voltage waveforms at very fast clock rates.

In another implementation, the processor 502 can be a single-threaded processor. In another implementation, the processor 502 can be a multi-threaded processor. In some implementations, the processor 502 can be capable of processing instructions stored in the memory 504 or on the storage device 506 to collect information from, and provide control signals to, the ignition module 505.

The memory 504 stores information within the controller 501. In some implementations, the memory 504 can be a computer-readable medium. In some implementations, the memory 504 can be a volatile memory unit. In some implementations, the memory 504 can be a non-volatile memory unit.

The storage device 506 is capable of providing mass storage for the system 100. In one implementation, the storage device 506 is a computer-readable medium. In various different implementations, the storage device 506 may be non-volatile information storage unit (e.g., FLASH memory).

The switching controller 508 provides control signal output operations for the controller 501. The switching controller 508 provides actuation control signals (e.g., pulse width modulated, PWM, driver signals) that activate the ignition module 505 and the fluid admission valve 550. For example, the switching controller 508 can include field effect transistors (FETs) or other switching devices that can convert a logic-level signal from the processor 502 to a current and/or voltage waveform with sufficient power to drive a coil of the ignition module 505. In another implementation, the switching controller 508 can provide digital or analog signals configured to control servo valves within the fluid admission valve 550.

The features described herein can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; and magneto-optical disks. The processor and the memory can be supplemented by, or incorporated in, ASICs (application-specific integrated circuits).

Although the examples shown in FIGS. 1A-5 depict cross-sectional views of a single cylinder 160, piston 150, and igniter carrier 101, the engine 100 and the system 500 can have more than one identical cylinder, piston, and pre-combustion chamber assembly. For example, the engine 100 can include 2, 4, 6, 8 or more cylinders 160 and pistons 150, each with a pre-igniter carrier 101 having a pre-combustion chamber 110.

Figure 6:
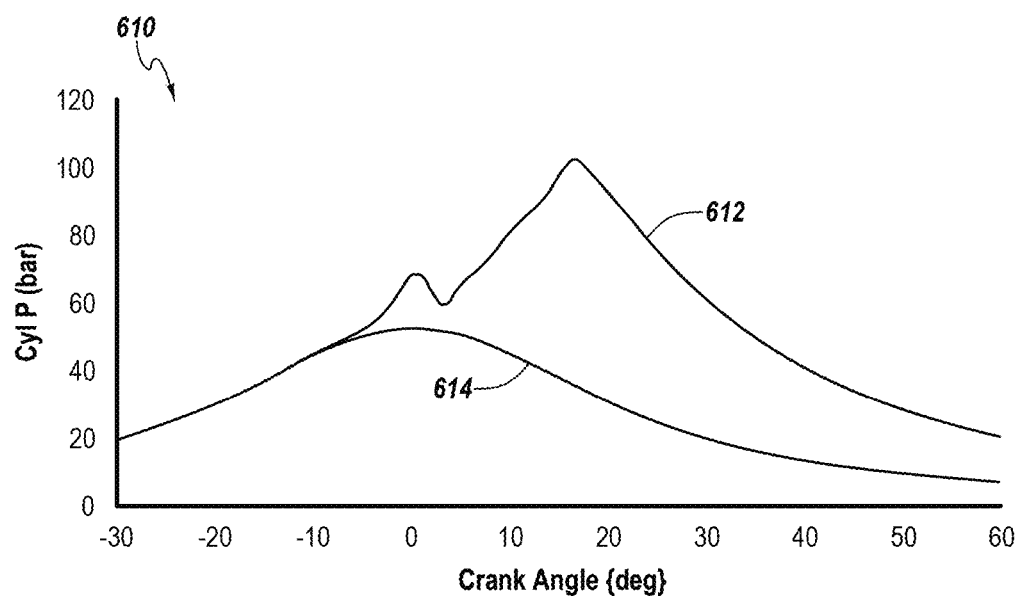
FIG. 6 shows two graphs of an example two phase spark ignited combustion event.
Figure 6:
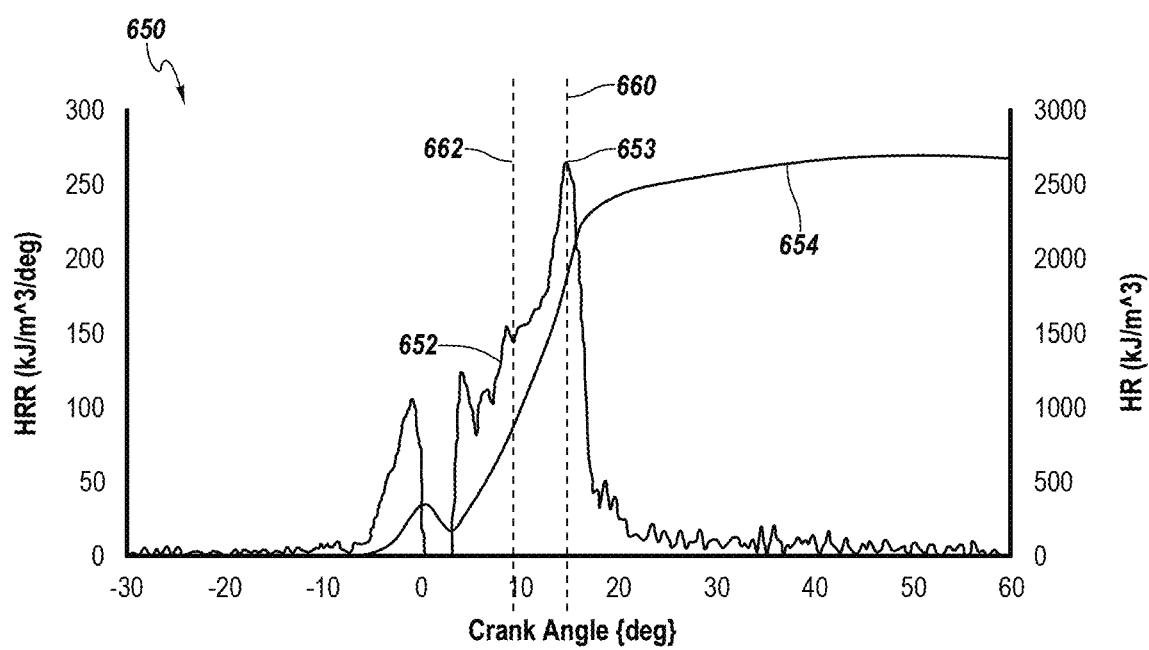

FIG. 6 shows a graph 610 and a graph 650 of an example two phase spark ignited combustion of a premixed natural gas, EGR, and air mixture. While auto-ignition of end gas is historically equated with knocking combustion, in certain instances, the concepts herein can generate conditions for and achieve auto-ignition of end gasses without knocking combustion.

In FIG. 6, a graph 610 shows an example of cylinder pressure (bar) and crank angle (degrees) according to the concepts herein, and includes a pressure trace 612 and a motored, polytropic curve 614. A graph 650 shows example traces of an example heat release rate trace 652 (HRR, $kj/m^3/deg$) and an integral (cumulative or total) heat release trace 654 (HR, $kj/m^3$) as functions of crank angle. In some implementations, the example controller 501 of FIG. 5 can be configured to measure, e.g., via input from (among other inputs) an in-cylinder pressure sensor, as discussed above, and analyze such information sensed from the engine 100, the pre-combustion igniter carrier 101, and/or the pre-combustion igniter carrier 101' of FIGS. 1A-5.

The HRR trace 652 is not typical of conventional combustion. A conventional HRR combustion curve would have a heat release rate curve that resembles a bell curve, wherein the peak of the HRR is near the centroid of the integral (CA50). In contrast, the disclosed combustion chamber topology and control techniques can have a HRR trace 652 with a peaked/triangular shape that rises until the combustion runs out of fuel to burn, then drops off sharply. This combustion pattern is a result of the "outside-in" controlled, flame propagated volumetric auto-ignition of the fuel, starting near the periphery of the main combustion chamber (e.g., due to the controlled timing of the pre-combustion ignition and the subsequent jetting of the pre-combustion gasses toward the periphery of the main combustion chamber), and propagating inward toward the center of the main combustion chamber (e.g., collecting and compressing the unburned air/fuel as the flame front progresses inward).

As described, this is an example where the last portion of the HRR (around 15 degrees after top dead center (ATDC), as highlighted by line 660) is much faster than the center of combustion HRR (around 10 degrees ATDC, as highlighted by line 662). Additionally, the integral HR trace 654 shows an upward concavity. The pressure trace 612, while showing a pressure rise due to auto-ignition of end gasses, does not show any pressure ripple or ringing associated with engine knock, and the peak of the pressure curve is near or slightly after the peak of the triangularly shaped HRR.

Typically, without the combustion control provided by the controller 501, this would be considered an unsafe operating condition on the edge of being out of control, and would be called un-controlled combustion. However, in the example shown, pressure based combustion feedback in the loop of the controller 501 maintains stable and phase controlled end gas combustion by adjusting the spark timing for each cycle.

However, with the combustion control provided by the controller 501 for the engine 500, the combustion process control variable can be moved closer to the end of the combustion cycle (e.g., by controlling engine parameters to control the location of CA75-85 or where peak HRR occurs), and to control the shutdown of the heat release based on the peak. In some implementations, the rate of heat release is possibly accelerated due to auto-ignition. The combustion control provided by the controller 501 for the engine 500, can alter the ignition timing such that gas expansion due to combustion starts during the constant volume portion of piston stroke, and peak HRR occurs at a predetermined crank angle (e.g., 15-20 degrees ATDC, although this target can change depending on the specific application, engine, loading, speed, and use case) as a function of mechanical expansion ratio for efficiency. For example, in certain instances, the controller 501 can be configured to identify the second peak in the HRR curve (e.g., the first peak near TDC is due to initial ignition in the prechamber and the peak 653 at 660, in FIG. 6, is due to combustion in the main combustion chamber), and in the next cycle of the cylinder, control engine parameters to shift the location of the second peak relative to piston position and affect, and in certain instances, optimize the efficiency of the combustion cycle in producing engine torque and power. In certain instances, the controller 501 can control engine parameters, including ignition timing, to control CA80 to be 15 degrees ATDC. The particular tuning and timing provided by the controller 501 (whether it be controlling the location of CA75, CA80, CA85 or another value and whether the target position be 15 degrees ATDC, 20 degrees ATDC or another value) can be determined automatically by the controller 501, or through simulation/modelling or experimentation and then provided to the controller 501.

The benefits of controlling the auto-ignition of end gasses are many, for example shorter burn duration, pressure rise after center of combustion, and quick burn up of the otherwise hard to burn gases in the end gas. The phenomena of auto-ignition of end gasses where in the bulk of candidate end gas goes off all at once or volumetrically is similar to the phenomena in HCCI and RCCI and their benefits, namely the substantial elimination of the propagating flame in favor of volumetric ignition.

Figure 7:
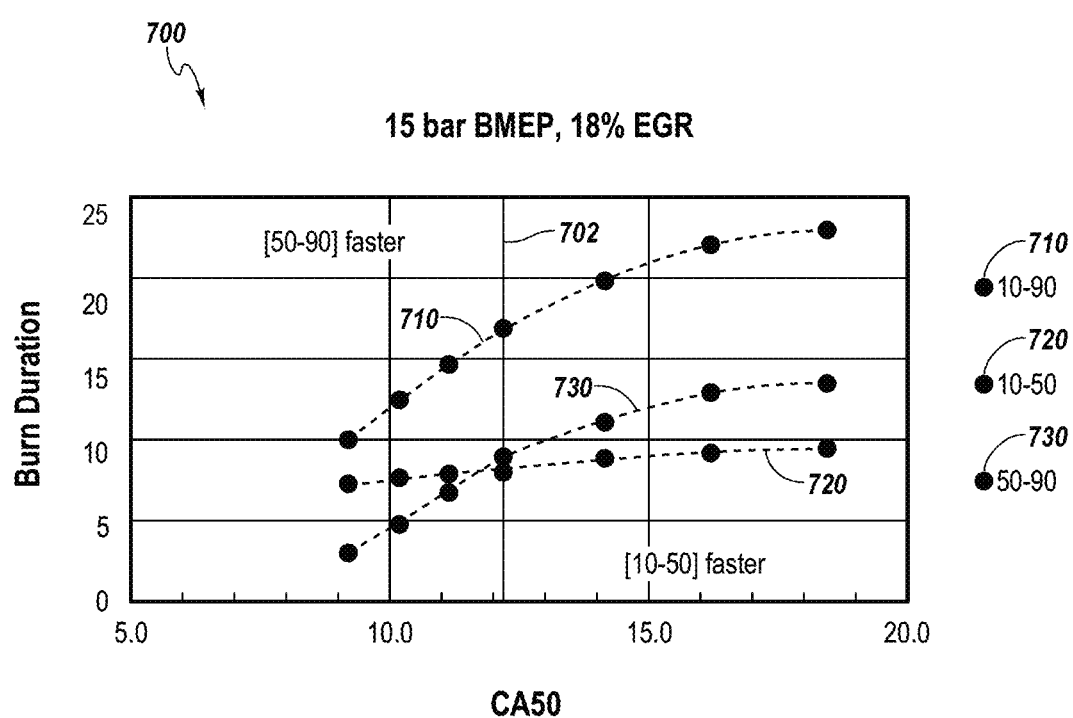
FIG. 7 is a graph that shows an example crossover point.

FIG. 7 is a graph 700 that shows an example crossover point near 12.5 ATDC (represented by line 702), where both halves of an example combustion burn rate are approximately equal in burn duration (BD) (e.g., [10-50] BD=[50-90] BD).

The graph 700 shows that, when starting on the right side (e.g., "retarded" combustion) and moving left (e.g., "advance" combustion) the [50-90] burn duration (represented by trace 730), which starts out longer than the [10-50] BD (represented by trace 720), the crossover point 702 at about 12.5 CA50, where the [50-90] BD becomes shorter and faster than the [10-50] BD, and provides a clear indications of auto-ignition in end gasses. In some implementations, the example controller 501 of FIG. 5 can be configured to sense, identify, and respond to detected auto-ignition of end gasses in real time or near real time, e.g. during the same combustion cycle the auto-ignition is identified in.

The graph 700 shows that the normal relationship that second half of the burn duration (e.g., [50-90] BD) is slower than the first half, as might be expected for normal gas engine combustion. However, moving from right to left it can be seen that at the cross-over point 702, where the second half of the burn duration (e.g., [50-90] BD) is approximately equal in duration as the first half (e.g., [10-50] BD), both halves have approximately same speed. When combustion phasing is further advanced, the second half of the combustion is now shorter than first half. This is the regime where auto-ignition of end gasses occurs, which serves to accomplish this unusual phenomenon. In some severe cases, the second half of the combustion is approximately ½ the duration of the first half.

Combustion and other measurable engine operational metrics (e.g., such as those shown as the example traces of FIGS. 5 and 6) can be measured by the controller 501, to identify patterns and trends to determine characteristics of combustion, and the controller 501 can modify operation of the engine system 500 based on such characteristics, patterns, and trends. For example, the HRR trace 652 exhibits an identifiable peaked triangular or tent-shaped characteristic having a peak 653. In another example, the HRR trace 652 exhibits an after center of combustion (CA50) that is greater than the HRR before center of combustion, in which HRR does not diminish like normal combustion that becomes "resource limited" (e.g., temperature, turbulence, fuel near liner and in crevice area). In another example, the controller 501 can quantify the [50-90] Burn Duration as being greater than or equal to the [10-50] Burn Duration. In another example, the upturned slope on the integrated total heat release curve after 50% MFB (e.g., ca50 or CoC) can be identified by the controller 501 and used as strong evidence of auto-ignition of end gasses.

The controller 501 is configured to sense combustion characteristics, such as those already discussed, and alter ignition timing (or EGR rates) in order to modify the timing of combustion relative to crank angle in order to modify the combustion process. For another example, the location of peak pressure (e.g., in trace 612) is approximately at the same location (or after) as the peak/end of the triangular burn.

The trace 612 is not what would be seen as a result of normal/typical combustion; during typical combustion, the peak pressure occurs near the center of combustion, not at the 90% MFB point as it is in the trace 612. In short, the system 500 can be configured to analyze combustion information in order to protect the system 500 and its geometry and control, and also cause the phenomena in which the second half burn time is shorter than first half burn time. In some examples, these outcomes can be verified experimentally (e.g., disassemble and inspect and/or pressure trace and heat release). While the distinction before and after 50% MFB is used in this example, in some embodiments, it would be possible to have a user defined ratio of fuel burned "via flame propagation" and "via auto-ignition" where another number than 50% could be used, i.e. 30% fuel burned by flame propagation which triggers the remaining 70% to be burned by auto-ignition. In the extreme, where 90% or more of the fuel is burned by auto-ignition, the flame would be only a minor trigger. The higher the compression ratio, the greater the degree of auto-ignition fraction can be achieved. And in the limit where a delta function of apparently total volumetric ignition would be HCCI or RCCI combustion. In any case, not only the timing of, but also the ratio of auto-ignition to flame propagation can be sensed and controlled.

Figure 8:
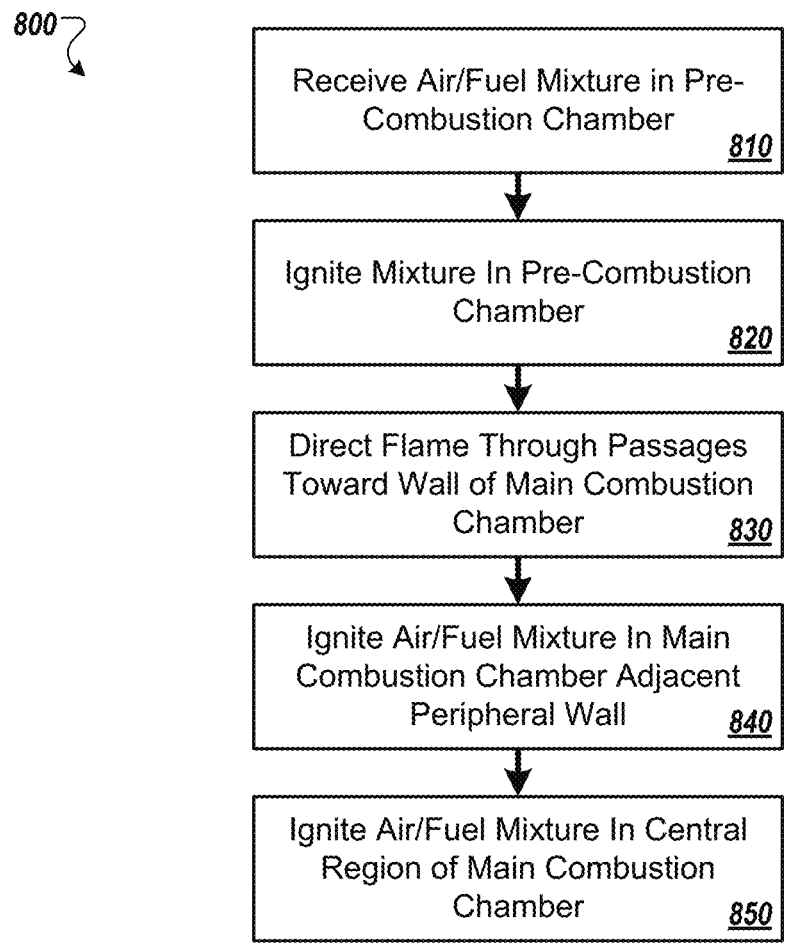
FIG. 8 is flow chart that shows an example of a process for combusting an air/fuel mixture in an internal combustion engine with a pre-combustion chamber, according to some embodiments.

FIG. 8 is flow chart that shows an example of a process 800 for combusting an air/fuel mixture in an internal combustion engine with a pre-combustion chamber, according to some embodiments. In some embodiments, the process 800 can be performed by the engine 100 of FIGS. 1A-4, or the system 500 of FIG. 5.

At 810 an air/fuel mixture is received into a pre-combustion chamber, the pre-combustion chamber enclosing a portion of an igniter. In some embodiments, the process 800 can include receiving air/fuel mixture from the main combustion chamber. For example, air and fuel provided to the main combustion chamber 170 can be pushed into the pre-combustion chamber 110 when the piston 150 is on a compression stroke, so called passive prechamber. In some embodiments, the pre-combustion chamber may be fitted with a dedicated enrichment or scavenging injector (e.g., sometimes called an "active prechamber").

In some embodiments, the piston can be configured with a bowl and the peripheral wall can be at least partly curved or angled, and a portion of the peripheral wall adjacent the ejected flame can have an orientation that is complimentary to a trajectory of the ejected flame. For example, peripheral wall 172 is formed as a bowl and the proximal portions 174 have a slope that is less than orthogonal to the trajectories 124.

In some embodiments, the bowl can be defined in the face of the piston of the internal combustion engine, and the process 600 can also include moving the piston proximal a top dead center position such that the nose extends at least partly into the bowl, and the bowl extends circumferentially around a portion of the nose. For example, when the piston 150 is moved near TDC, the nose 121 and the passages 120 defined within the nose 121 extend partly into the main combustion chamber 170.

In some embodiments, the main combustion chamber can also include an elongate cylindrical chamber having a cylindrical wall, the face and the bowl at a first end, and a cylinder head at a second end opposite the first end. For example, the main combustion chamber 170 can be defined by the peripheral wall 172, the face 154, the cylinder head 164, the peripheral wall 162 of the cylinder 160, and piston rings (not shown) that seal the piston 150 against the peripheral wall 162.

Historically, techniques for speeding up combustion with EGR added turbulence to swirl or tumble an air/fuel mixture at the intake valves, and then "squish" the mixture between the top of the piston land and the cylinder head creating squish, which jets the mixture out of the piston land region into the bowl where the turbulence in the bowl leads to fast combustion. In the illustrated embodiment, no such squish-generated turbulence is required, so a quiescent low swirl intake system and low squish can be used because the pre-combustion chamber turbulent jets generate the turbulence (e.g., much like diesel spray plumes generate their own turbulence). Thus the illustrated examples could have a large squish region gap specification.

At 820, the air/fuel mixture in in the pre-combustion chamber is ignited to produce a flame jet. For example, the igniter 114 can be energized to create an ignition that ignites the air/fuel mixture in the pre-combustion chamber 110.

At 830 the flame is directed to eject the pre-combustion chamber through a collection of passages in a wall of the pre-combustion chamber, toward a peripheral wall of a main combustion chamber of the internal combustion engine. In some embodiments, the flame is ejected from the pre-combustion chamber through a collection of passages using pressure from combustion in the pre-combustion chamber. In some embodiments, directing the flame to eject the pre-combustion chamber through the collection of passages in a wall of the pre-combustion chamber, toward the peripheral wall of the main combustion chamber of the internal combustion engine can include ejecting the flame toward the peripheral wall in a radial pattern. In some embodiments, directing the flame to eject the pre-combustion chamber through the collection of passages in a wall of the pre-combustion chamber, toward the peripheral wall of the main combustion chamber of the internal combustion engine can include ejecting the flame orthogonal to a cylinder wall of the engine. For example, as illustrated in FIG. 2A, pressures created within the pre-combustion chamber 110 can drive fluids in the pre-combustion chamber 110 to escape through the passages 120. The jet apertures 122 direct the escaping combusting gasses substantially orthogonal to the peripheral wall 162 and the proximal portion 174 of the peripheral wall 172.

In some embodiments, each of the passages can have a width, and each of the passages can have a length that is at least an order of magnitude greater than the width. For example, the passages 120 are generally tubular in shape, each being substantially longer (e.g., 2×, 5×, 10×, 50×) than their width. The ratio of length to width and other geometrical properties of the passages 120 can be selected to promote efficient evacuation of the pre-combustion chamber 110 and jetting of ejected combusting gasses into the main combustion chamber 170.

At 840, the flame ignites the air/fuel mixture in the main combustion chamber adjacent the peripheral wall. For example, as illustrated in FIG. 3, the combusting gasses ejected from the jet apertures 122 travel along the peripheral wall 172, igniting additional air/fuel mixture proximal the peripheral wall 172.

At 850, the air/fuel mixture in the main combustion chamber in a central region of the main combustion chamber is ignited with the ignited air/fuel mixture adjacent the peripheral wall. For example, as illustrated in FIG. 4, the combustion that occurs initially near the peripheral wall 172 propagates centrally inward, igniting the still-unburned air/fuel mixture near the center 176.

In some embodiments, the process 800 can also include receiving, from a pressure sensor configured to measure fluid pressure in the pre-combustion chamber, a pressure signal, and adjusting ignition timing of the engine based on the pressure signal. For example, the example controller 501 of FIG. 5 can receive pressure signals from the pressure sensor 118, and adjust the ignition timing of the igniter 114 based on patterns and trends within the pressure signals that can be identified by the controller 501.

While most of the examples discussed in this document describe systems in which the controller configured to adjust activation of the igniter based on the pressure signal such that CA50 to CA90 is shorter than CA10 to CA50, the controller can be configured to control other combustion patterns. In some implementations, the controller can be configured such that the "later" burn rates are faster than the previous burn rates. For example, the controller can be configured more aggressively, such as 10% propagating and 90% auto-ignition. In another example, the controller can be configured with more relaxed parameters, such as 90% MFB propagating flame and 10% auto-ignition.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of igniting an air/fuel mixture in an internal combustion engine, the method comprising:
   receiving an air/fuel mixture into a pre-combustion chamber, the pre-combustion chamber enclosing a portion of an igniter;
   igniting the air/fuel mixture in in the pre-combustion chamber with the igniter to produce a flame, the pre-combustion chamber having a wall and a plurality of passages in the wall proximal a cylinder head;
   moving a piston proximal a top dead center position wherein a portion of the wall extends into an ovoid bowl defined in a face of the piston of the internal combustion engine with the face and the ovoid bowl at a first end and the cylinder head at a second end opposite the first end, the ovoid bowl having an ovoid bowl wall that is at least partly curved or angled to define a center of the ovoid bowl, and a portion of the ovoid bowl wall adjacent the face is obtuse to the face, and a portion of the ovoid bowl extends circumferentially around a portion of the wall, and defining a gap between the cylinder head, the face of the piston, and a peripheral wall of a main combustion chamber of the internal combustion engine;

directing the flame to eject the pre-combustion chamber through the plurality of passages in the wall of the pre-combustion chamber proximal to the cylinder head away from the center of the ovoid bowl, along a periphery of the cylinder head, toward the gap and the portion of the ovoid bowl wall adjacent the face; then igniting, by the ejected flame, air/fuel mixture in the main combustion chamber adjacent the ovoid bowl wall; and then igniting air/fuel mixture in the main combustion chamber in a central region of the main combustion chamber with a propagating flame front of the ignited air/fuel mixture or a portion of the directed flame adjacent the ovoid bowl wall.

2. The method of claim 1, wherein the main combustion chamber comprises the ovoid bowl, an elongate cylindrical chamber having a cylindrical wall, and the cylinder head, and a portion of the ovoid bowl wall adjacent the ejected flame has an orientation that is obtuse to a trajectory of the ejected flame.

3. The method of claim 1, wherein all air/fuel mixture received in the pre-combustion chamber is received from the main combustion chamber.

4. The method of claim 1, wherein directing the flame to eject the pre-combustion chamber through the plurality of passages in the wall of the pre-combustion chamber proximal to the cylinder head, toward the gap and the portion of the ovoid bowl wall adjacent the face further comprises ejecting the flame orthogonal to a cylinder wall of the main combustion chamber more laterally than axially.

5. The method of claim 1, wherein each of the passages has a width, and each of the passages has a length that is at least an order of magnitude greater than the width.

6. The method of claim 1, further comprising:
receiving, from a pressure sensor in the pre-combustion chamber and configured to measure fluid pressure in the pre-combustion chamber and the main combustion chamber, a pressure signal; and
adjusting ignition timing of the engine based on the pressure signal such that CA50 to CA90 is shorter than CA10 to CA50.

7. The method of claim 6, further comprising:
compressing, by the propagating flame front propagating from the peripheral wall toward a central region of the combustion chamber, unburned air/fuel mixture in the central region; and then
auto-igniting unburned air/fuel mixture in the central region;
wherein later portions of mass fraction burned (MFB) rate are faster than initial MFB rates of the propagating flame front.

8. The method of claim 1, further comprising:
receiving, from a pressure sensor in the pre-combustion chamber or main combustion chamber and configured to measure fluid pressure in the pre-combustion chamber and the main combustion chamber, a pressure signal; and
adjusting ignition timing of the engine, in another combustion cycle after the pressure signal is received, based on the pressure signal such that about 85% of heat release (HR) occurs by a predetermined point about 20 degrees after top dead center.

9. A system for igniting a mixture in an internal combustion engine, the system comprising: an igniter; a main combustion chamber having a peripheral wall defining a center axis and comprising an elongate cylindrical chamber having a cylindrical wall, a piston of the internal combustion engine with a face at a first end, a cylinder head at a second end opposite the first end, an ovoid bowl defined in the face of the piston and having an ovoid bowl wall that is at least partly curved or angled defining a center of the ovoid bowl, and a portion of the ovoid bowl wall adjacent the face is obtuse to the face, and a gap defined between the cylinder head, the face of the piston, and the cylindrical wall; a pre-combustion chamber centered on the center axis and enclosing a portion of the igniter; a plurality of passages in a wall of the pre-combustion chamber, each passage fluidly connecting the pre-combustion chamber and the main combustion chamber and having a jet aperture proximal to the cylinder head away from the center of the ovoid bowl and configured to direct fluid flow from the passage along a periphery of the cylinder head toward the gap and the peripheral wall more laterally than axially, wherein a portion of the wall of the pre-combustion chamber extends into the ovoid bowl, and the portion of the ovoid bowl extends circumferentially around a portion of the wall of the pre-combustion chamber when the piston is configured proximal a top dead center position.

10. The system of claim 9, wherein a portion of the ovoid bowl wall adjacent the directed fluid flow has an orientation that is obtuse to a trajectory of the directed fluid flow.

11. The system of claim 9, wherein the pre-combustion chamber further comprises a nose that defines the plurality of passages.

12. The system of claim 9, wherein the jet apertures of the plurality of passages are arranged radially.

13. The system of claim 9, wherein the jet apertures of the plurality of passages are arranged to direct fluid flow, ejected from pre-combustion chamber through the plurality of passages, orthogonal to the cylindrical wall.

14. The system of claim 9, wherein each of the passages has a width, and each of the passages has a length that is at least an order of magnitude greater than the width.

15. The system of claim 9, wherein:
the pre-combustion chamber is configured to receive air/fuel mixture;
the igniter is configured to ignite air/fuel mixture in the pre-combustion chamber to produce a flame; and
the plurality of passages are configured to direct the flame to eject the pre-combustion chamber through the jet apertures in a wall of the pre-combustion chamber, proximal to the cylinder head, away from the center of the ovoid bowl, and toward the cylindrical wall of the main combustion chamber.

16. The system of claim 9, wherein the ovoid bowl wall of the main combustion chamber is configured to receive a portion of fluid flow directed from the jet apertures, and redirect the portion such that air/fuel mixture in the main combustion chamber proximal the ovoid bowl wall is ignited by the portion, and then air/fuel mixture proximal a central region of the main combustion chamber is ignited by flame proximal the peripheral wall.

17. The system of claim 9, further comprising a pressure sensor in the pre-combustion chamber or main combustion chamber configured to provide a pressure signal representative of a fluid pressure in the pre-combustion chamber and the main combustion chamber.

18. The system of claim 17, further comprising a controller configured to adjust activation of the igniter based on the pressure signal such that CA50 to CA90 is shorter than CA10 to CA50.

19. The system of claim 17, further comprising a controller configured to adjust activation of the igniter based on the pressure signal such that about 85% of heat release (HR) occurs by about 20 degrees after top dead center.

20. An internal combustion engine comprising: an igniter; a main combustion chamber having a peripheral wall defining a center axis and comprising an elongate cylindrical chamber having a cylindrical wall, a piston of the internal combustion engine with a face at a first end, a cylinder head at a second end opposite the first end, an ovoid bowl defined in the face of the piston and having an ovoid bowl wall that is at least partly curved or angled defining a center of the ovoid bowl, and a portion of the ovoid bowl wall adjacent the face is obtuse to the face, and a gap defined between the cylinder head, the face of the piston, and the cylindrical wall; an enclosure receiving the igniter, the enclosure defining a pre-combustion chamber centered on the center axis and enclosing a portion of the igniter; and a plurality of passages in a wall of the pre-combustion chamber, each passage fluidly connecting the pre-combustion chamber and the main combustion chamber and having a jet aperture proximal to the cylinder head away from the center of the ovoid bowl and configured to direct fluid flow from the passage along a periphery of the cylinder head toward the gap and the peripheral wall more laterally than axially, wherein a portion of the wall of the pre-combustion chamber extends into the ovoid bowl, and the portion of the ovoid bowl extends circumferentially around a portion of the wall of the pre-combustion chamber when the piston is configured proximal a top dead center position.

21. The engine of claim 20, wherein a portion of the wall of the pre-combustion chamber is configured to partly extend into the ovoid bowl when the piston is near top dead center.

22. The engine of claim 20, wherein the ovoid bowl wall is configured to receive a flame ejected from the jet apertures and travelling along a periphery of the cylinder head, and redirect a portion of the flame such that air/fuel mixture in the main combustion chamber proximal the ovoid bowl wall is ignited by the portion, and then air/fuel mixture proximal a central region of the main combustion chamber is ignited by flame proximal the ovoid bowl wall.

23. The engine of claim 20, wherein each of the passages has a width, and each of the passages has a length that is at least an order of magnitude greater than the width.

24. The engine of claim 20, wherein the jet apertures of the plurality of passages are arranged radially.

25. The engine of claim 20, wherein the jet apertures of the plurality of passages are arranged to direct flame ejected from pre-combustion chamber through the plurality of passages orthogonal to the cylindrical wall.

26. The engine of claim 20, further comprising a pressure sensor configured to provide a pressure signal representative of a fluid pressure in the pre-combustion chamber and fluid pressure in the main combustion chamber.

27. The engine of claim 26, further comprising a controller configured to adjust activation of the igniter based on the pressure signal such that CA50 to CA90 is shorter then CA10 to CA50.

28. The engine of claim 26, further comprising a controller configured to adjust activation of the igniter based on the pressure signal such that about 85% of heat release (HR) occurs by about 20 degrees after top dead center.

29. The engine of claim 20, wherein the jet aperture is configured to direct fluid flow from the passage along a periphery of the cylinder head and away from a center of the ovoid bowl.

30. The engine of claim 20, wherein the jet aperture is configured to direct the fluid flow along a trajectory that is substantially orthogonal to a center axis of the pre-combustion chamber.

31. The engine of claim 30, wherein the trajectory is at an angle between +30 degrees and −30 degrees away from orthogonal to the center axis of the pre-combustion chamber.

32. The system of claim 9, wherein the jet aperture is configured to direct fluid flow from the passage along a periphery of the cylinder head and away from a center of the ovoid bowl.

33. The system of claim 9, wherein the jet aperture is configured to direct the fluid flow along a trajectory that is substantially orthogonal to a center axis of the pre-combustion chamber.

34. The system of claim 33, wherein the trajectory is at an angle between +30 degrees and −30 degrees away from orthogonal to the center axis of the pre-combustion chamber.

35. The method of claim 1, wherein directing the flame to eject the pre-combustion chamber through the plurality of passages in the wall of the pre-combustion chamber proximal to the cylinder head away from the center of the ovoid bowl, toward the gap and the portion of the ovoid bowl wall adjacent the face comprises directing the flame to eject the pre-combustion chamber through the plurality of passages in the wall of the pre-combustion chamber, along the periphery of the cylinder head and away from the center of the ovoid bowl toward the peripheral wall.

36. The method of claim 1, wherein directing the flame to eject the pre-combustion chamber through the plurality of passages in the wall of the pre-combustion chamber proximal to the cylinder head away from the center of the ovoid bowl, toward the gap and the portion of the ovoid bowl wall adjacent the face comprises directing the flame to eject the pre-combustion chamber through the plurality of passages in the wall of the pre-combustion chamber, toward the wall along a trajectory that is substantially orthogonal to a center axis of the pre-combustion chamber.

37. The method of claim 1, wherein directing the flame to eject the pre-combustion chamber through the plurality of passages in the wall of the pre-combustion chamber proximal to the cylinder head away from the center of the ovoid bowl, toward the gap and the portion of the ovoid bowl wall adjacent the face comprises directing the flame to eject the pre-combustion chamber in a radially outward pattern away from a center axis of the main combustion chamber through the plurality of passages in the wall of the pre-combustion chamber proximal to the cylinder head, toward the peripheral wall.

* * * * *

UNITED STATES PATENT AND TRADEMARK OFFICE
CERTIFICATE OF CORRECTION

| | |
|---|---|
| PATENT NO. | : 11,415,041 B2 |
| APPLICATION NO. | : 16/572474 |
| DATED | : August 16, 2022 |
| INVENTOR(S) | : Domenico Chiera et al. |

It is certified that error appears in the above-identified patent and that said Letters Patent is hereby corrected as shown below:

On the Title Page

Item (57) Abstract, Line 6, delete "in in" and insert -- in --.

Item (56) References Cited, OTHER PUBLICATIONS, page 3, Column 2, Line 41, delete "4544" and insert -- 1544 --.

In the Specification

Column 1, Line 32, delete "in in" and insert -- in --.

Column 4, Line 12, delete "collectivication" and insert -- collectivization --.

Column 4, Line 30, delete "occurs", The" and insert -- occurs". The --.

Column 4, Line 44, after "duration" insert -- ) --.

Column 8, Line 2, after "154" insert -- ) --.

Column 10, Line 5, after "154" insert -- ) --.

Column 13, Line 27, delete "lamba" and insert -- lambda --.

Column 16, Line 39, delete "HR" and insert -- HRR --.

Column 19, Line 36, delete "in in" and insert -- in --.

In the Claims

Column 20, Line 57, Claim 1, delete "in in" and insert -- in --.

Signed and Sealed this
Sixth Day of December, 2022

Katherine Kelly Vidal
*Director of the United States Patent and Trademark Office*